(12) United States Patent
Cornwell et al.

(10) Patent No.: US 9,654,432 B2
(45) Date of Patent: *May 16, 2017

(54) SYSTEMS AND METHODS FOR CLUSTERING ELECTRONIC MESSAGES

(71) Applicant: Google Inc., Mountain View (CA)

(72) Inventors: Jason Briggs Cornwell, Menlo Park, CA (US); Keith Coleman, Palo Alto, CA (US); Jeroen Daniël Jillissen, Palo Alto, CA (US); Thompson Alexander-Ivor Gawley, Palo Alto, CA (US); Rob Young, San Francisco, CA (US); Garrick Toubassi, Los Altos, CA (US)

(73) Assignee: Google Inc., Mountain View, CA (US)

( * ) Notice: Subject to any disclaimer, the term of this patent is extended or adjusted under 35 U.S.C. 154(b) by 2 days.

This patent is subject to a terminal disclaimer.

(21) Appl. No.: 14/610,970

(22) Filed: Jan. 30, 2015

(65) Prior Publication Data

US 2015/0180811 A1 Jun. 25, 2015

Related U.S. Application Data

(63) Continuation of application No. 14/139,205, filed on Dec. 23, 2013, now Pat. No. 8,949,283.

(51) Int. Cl.
*G06F 17/30* (2006.01)
*H04L 12/58* (2006.01)
*G06Q 10/10* (2012.01)

(52) U.S. Cl.
CPC ........ *H04L 51/12* (2013.01); *G06F 17/30011* (2013.01); *G06F 17/3071* (2013.01); *G06Q 10/107* (2013.01)

(58) Field of Classification Search
CPC ............................ H04L 51/12; G06Q 10/107
See application file for complete search history.

(56) References Cited

U.S. PATENT DOCUMENTS

| 4,914,650 A | 4/1990 | Sriram |
| 5,948,040 A | 9/1999 | DeLorme et al. |
| 5,948,058 A * | 9/1999 | Kudoh ................. G06Q 10/107 705/30 |

(Continued)

OTHER PUBLICATIONS

William Cohen "Learning Rules that classify E-mail", Feb. 22, 2002.*

*Primary Examiner* — Tarek Chbouki
(74) *Attorney, Agent, or Firm* — Morgan, Lewis & Bockius LLP

(57) ABSTRACT

Systems and methods for clustering electronic messages are disclosed. In some implementations, a method includes, at a computing device, responsive to a determination that a message body of a first electronic message satisfies a set of content-based clustering rules associated with a first message cluster, assigning the electronic message to the message cluster. A cluster graphic is displayed for the message cluster. The cluster graphic is characterized by (a) a first state in which messages in the message cluster are individually depicted and (b) a second state, which replaces the first state upon user input and collectively represents a plurality of messages in the message cluster. Each message in the message cluster is either (i) addressed at least to a first recipient or (ii) originates from the first recipient.

18 Claims, 16 Drawing Sheets

(56) References Cited

U.S. PATENT DOCUMENTS

| | | | |
|---|---|---|---|
| 6,044,260 A | 3/2000 | Eaton et al. | |
| 6,057,841 A | 5/2000 | Thurlow et al. | |
| 6,147,977 A | 11/2000 | Thro et al. | |
| 6,232,972 B1 | 5/2001 | Arcuri et al. | |
| 6,252,597 B1 | 6/2001 | Lokuge | |
| 6,333,973 B1 | 12/2001 | Smith et al. | |
| 6,351,764 B1 | 2/2002 | Voticky et al. | |
| 6,421,709 B1 | 7/2002 | McCormick et al. | |
| 6,507,866 B1 | 1/2003 | Barchi | |
| 6,700,591 B1 | 3/2004 | Sharpe | |
| 6,704,772 B1 | 3/2004 | Ahmed et al. | |
| 6,725,228 B1 | 4/2004 | Clark et al. | |
| 6,778,642 B1 | 8/2004 | Schmidt, Jr. et al. | |
| 6,961,341 B1 | 11/2005 | Krishnan | |
| 7,120,865 B1 | 10/2006 | Horvitz et al. | |
| 7,167,910 B2 | 1/2007 | Farnham et al. | |
| 7,194,516 B2 | 3/2007 | Giacobbe et al. | |
| 7,359,947 B2 | 4/2008 | Kelley et al. | |
| 7,386,535 B1 | 6/2008 | Kalucha et al. | |
| 7,415,504 B2 | 8/2008 | Schiavone et al. | |
| 7,421,690 B2 | 9/2008 | Forstall et al. | |
| 7,429,993 B2 | 9/2008 | Hui | |
| 7,475,120 B1 | 1/2009 | Ngo et al. | |
| 7,506,263 B1 | 3/2009 | Johnston et al. | |
| 7,536,652 B2 | 5/2009 | Uemura et al. | |
| 7,539,732 B2 | 5/2009 | Kelso et al. | |
| 7,568,011 B2 | 7/2009 | Bocking et al. | |
| 7,689,656 B2 | 3/2010 | McCarthy et al. | |
| 7,730,137 B1 | 6/2010 | Toomey | |
| 7,765,212 B2 | 7/2010 | Surendran et al. | |
| 7,788,329 B2 | 8/2010 | Barrett et al. | |
| 7,814,155 B2 | 10/2010 | Buchheit et al. | |
| 7,895,279 B2 | 2/2011 | Forstall et al. | |
| 7,895,537 B2 | 2/2011 | Gruen et al. | |
| 7,958,099 B2 | 6/2011 | Kang et al. | |
| 7,979,501 B1 | 7/2011 | Coleman et al. | |
| 7,996,900 B2 | 8/2011 | Gillum et al. | |
| 8,010,613 B2 | 8/2011 | Oral et al. | |
| 8,031,845 B2 | 10/2011 | Gruen et al. | |
| 8,041,745 B2 | 10/2011 | Newton et al. | |
| 8,065,369 B2 | 11/2011 | Turski et al. | |
| 8,095,400 B2 | 1/2012 | Herde et al. | |
| 8,108,469 B2 | 1/2012 | Kent, Jr. et al. | |
| 8,140,703 B2 | 3/2012 | Morris et al. | |
| 8,150,926 B2 | 4/2012 | Sundararajan et al. | |
| 8,150,930 B2 | 4/2012 | Satterfield et al. | |
| 8,176,130 B2 | 5/2012 | Daniell | |
| 8,224,902 B1 | 7/2012 | Glasser et al. | |
| 8,230,350 B2 | 7/2012 | Dodsworth | |
| 8,233,885 B2 | 7/2012 | Kansal et al. | |
| 8,239,874 B2 | 8/2012 | Anderson et al. | |
| 8,281,382 B1 | 10/2012 | Sanyal et al. | |
| 8,286,089 B2 | 10/2012 | Hardy et al. | |
| 8,307,029 B2 | 11/2012 | Davis et al. | |
| 8,375,307 B2 | 2/2013 | Kim | |
| 8,375,400 B2 | 2/2013 | Sutedja et al. | |
| 8,402,096 B2 | 3/2013 | Affronti et al. | |
| 8,448,084 B2 | 5/2013 | Brichter | |
| 8,499,042 B2 | 7/2013 | Brown et al. | |
| 8,499,048 B2 | 7/2013 | Malik et al. | |
| 8,533,274 B2 | 9/2013 | Buchheit et al. | |
| 8,560,619 B1 | 10/2013 | Huston et al. | |
| 8,572,277 B2 | 10/2013 | Morris et al. | |
| 8,577,967 B1 | 11/2013 | Chavez et al. | |
| 8,583,747 B2 | 11/2013 | Buchheit et al. | |
| 8,626,851 B2 | 1/2014 | Buchheit et al. | |
| 8,656,289 B1 | 2/2014 | Dodsworth | |
| 8,701,018 B1 | 4/2014 | Keel et al. | |
| 2002/0143871 A1 | 10/2002 | Meyer et al. | |
| 2002/0160757 A1 | 10/2002 | Shavit et al. | |
| 2003/0020749 A1 | 1/2003 | Abu-Hakima et al. | |
| 2003/0154212 A1 | 8/2003 | Schirmer et al. | |
| 2003/0177190 A1 | 9/2003 | Moody et al. | |
| 2003/0195811 A1 | 10/2003 | Hayes, Jr. et al. | |
| 2003/0214534 A1 | 11/2003 | Uemura et al. | |
| 2003/0233419 A1 | 12/2003 | Beringer | |
| 2004/0078190 A1 | 4/2004 | Fass et al. | |
| 2004/0153456 A1 | 8/2004 | Charnock et al. | |
| 2004/0199529 A1 | 10/2004 | Clark et al. | |
| 2004/0254998 A1 | 12/2004 | Horvitz | |
| 2005/0004990 A1 | 1/2005 | Durazo et al. | |
| 2005/0018819 A1 | 1/2005 | Schmidt et al. | |
| 2005/0080851 A1 | 4/2005 | Kent, Jr. et al. | |
| 2005/0080862 A1 | 4/2005 | Kent, Jr. et al. | |
| 2005/0102366 A1 | 5/2005 | Kirsch | |
| 2005/0114781 A1 | 5/2005 | Brownholtz et al. | |
| 2005/0138552 A1 | 6/2005 | Venolia | |
| 2005/0193076 A1 | 9/2005 | Flury et al. | |
| 2005/0193345 A1 | 9/2005 | Klassen et al. | |
| 2005/0228790 A1* | 10/2005 | Ronnewinkel | G06Q 10/107 |
| 2005/0246658 A1 | 11/2005 | Uemura et al. | |
| 2005/0256968 A1 | 11/2005 | Johnson | |
| 2006/0010215 A1 | 1/2006 | Clegg et al. | |
| 2006/0031340 A1 | 2/2006 | Mathew et al. | |
| 2006/0031347 A1 | 2/2006 | Sahi | |
| 2006/0059238 A1 | 3/2006 | Slater et al. | |
| 2006/0064410 A1 | 3/2006 | Razza et al. | |
| 2006/0069734 A1 | 3/2006 | Gersh et al. | |
| 2006/0075044 A1 | 4/2006 | Fox et al. | |
| 2006/0095466 A1 | 5/2006 | Stevens et al. | |
| 2006/0123360 A1 | 6/2006 | Anwar et al. | |
| 2006/0173824 A1 | 8/2006 | Bensky et al. | |
| 2006/0173961 A1 | 8/2006 | Turski et al. | |
| 2006/0206495 A1 | 9/2006 | Van Gageldonk et al. | |
| 2006/0277504 A1 | 12/2006 | Zinn | |
| 2007/0005592 A1 | 1/2007 | Kender et al. | |
| 2007/0038718 A1 | 2/2007 | Khoo et al. | |
| 2007/0106729 A1 | 5/2007 | Adams et al. | |
| 2007/0156669 A1 | 7/2007 | Marchisio et al. | |
| 2007/0262861 A1 | 11/2007 | Anderson et al. | |
| 2007/0277113 A1 | 11/2007 | Agrawal et al. | |
| 2007/0299923 A1 | 12/2007 | Skelly et al. | |
| 2008/0215687 A1 | 9/2008 | Madnani | |
| 2009/0089798 A1 | 4/2009 | Anderson et al. | |
| 2010/0030798 A1 | 2/2010 | Kumar et al. | |
| 2010/0049806 A1 | 2/2010 | Haynes et al. | |
| 2010/0056221 A1 | 3/2010 | Park | |
| 2010/0114855 A1 | 5/2010 | Li et al. | |
| 2010/0199180 A1 | 8/2010 | Brichter | |
| 2010/0262922 A1 | 10/2010 | Fan et al. | |
| 2010/0278453 A1 | 11/2010 | King | |
| 2010/0306249 A1 | 12/2010 | Hill et al. | |
| 2011/0010182 A1 | 1/2011 | Turski et al. | |
| 2011/0072363 A1 | 3/2011 | Mandel et al. | |
| 2011/0231499 A1* | 9/2011 | Stovicek | H04M 1/72547 709/206 |
| 2011/0289106 A1 | 11/2011 | Rankin, Jr. et al. | |
| 2012/0102037 A1 | 4/2012 | Ozonat | |
| 2012/0131095 A1 | 5/2012 | Luna et al. | |
| 2012/0180021 A1 | 7/2012 | Byrd et al. | |
| 2012/0185781 A1 | 7/2012 | Guzman et al. | |
| 2012/0185797 A1 | 7/2012 | Thorsen et al. | |
| 2012/0198053 A1 | 8/2012 | Ozhan et al. | |
| 2012/0204191 A1 | 8/2012 | Shia et al. | |
| 2012/0210334 A1 | 8/2012 | Sutedja et al. | |
| 2012/0271908 A1 | 10/2012 | Luna et al. | |
| 2012/0272160 A1 | 10/2012 | Spivack et al. | |
| 2013/0024440 A1 | 1/2013 | Dimassimo et al. | |
| 2013/0055099 A1 | 2/2013 | Yao et al. | |
| 2013/0055105 A1 | 2/2013 | Spierer | |
| 2013/0110953 A1 | 5/2013 | Sutedja et al. | |
| 2013/0159879 A1 | 6/2013 | Affronti et al. | |
| 2013/0165165 A1 | 6/2013 | Macek et al. | |
| 2013/0166280 A1 | 6/2013 | Quast et al. | |
| 2013/0212189 A1 | 8/2013 | Velissarakos | |
| 2013/0297604 A1 | 11/2013 | Sutedja et al. | |
| 2013/0305187 A1 | 11/2013 | Phillips et al. | |
| 2013/0325705 A1 | 12/2013 | Laird et al. | |
| 2013/0332850 A1 | 12/2013 | Bovet et al. | |
| 2014/0052797 A1 | 2/2014 | Lessard et al. | |
| 2014/0096032 A1 | 4/2014 | Mayblum et al. | |
| 2014/0096033 A1* | 4/2014 | Blair | G06F 3/01 715/752 |
| 2014/0115495 A1 | 4/2014 | Wetherell et al. | |

(56) References Cited

U.S. PATENT DOCUMENTS

| | | |
|---|---|---|
| 2014/0279016 A1 | 9/2014 | Capel et al. |
| 2014/0280619 A1 | 9/2014 | Banatwala et al. |
| 2014/0280635 A1 | 9/2014 | Bengochea et al. |
| 2014/0344711 A1 | 11/2014 | Hallerstrom Sjostedt et al. |
| 2014/0359480 A1 | 12/2014 | Vellal et al. |
| 2015/0088784 A1* | 3/2015 | Dhara .................. G06N 5/02 706/11 |

* cited by examiner

SYSTEMS AND METHODS FOR CLUSTERING ELECTRONIC MESSAGES

CROSS REFERENCE TO RELATED APPLICATION

This application claims priority to U.S. application Ser. No. 14/139,205, filed Dec. 23, 2013 entitled "Systems and Methods for Clustering Electronic Messages," now U.S. Pat. No. 8,949,283, which is hereby incorporated by reference herein in its entirety.

TECHNICAL FIELD

The implementations disclosed herein relate generally to clustering electronic messages.

BACKGROUND

Nowadays, a user on average receives hundreds, if not thousands, of electronic messages a day. For ease of reference, it may be preferred that messages containing a particular type of content (e.g., emails relating to travels, such as rental car bookings, flight tickets, and hotel reservations) are automatically organized together, even though these message themselves do not appear related to one another. As another example, users would often like to have messages relating to social network updates—e.g., Jane, a law school friend, recently joined a GOOGLE+ group for young alumni; and Tim, a co-worker, has just published a vacation photo on his GOOGLE PICASA website—grouped together, or those relating to online orders—e.g., a pair of dress shoes and a smart phone Jack bought separately are about to be shipped and delivered, respectively—visually presented as adjacent to each other.

Difficulties abound, however. One technical problem is that making accessible messages in one category may obscure access for those in another category. For example, displaying "Travel" emails in a tab view might prevent direct (and thus readily) access to "Promotion" emails available only in a different tab view. Another technical problem is that making simultaneously accessible messages across different content categories could disturb grouping of messages from a same content category. For example, in some email systems, messages across different content categories are scattered all over the inbox, rendering it difficult to access together a particular category of messages (e.g., "Promotion" emails).

The above identified technical problems are reduced or eliminated by the systems and methods disclosed herein.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings.

SUMMARY

Figure 1:
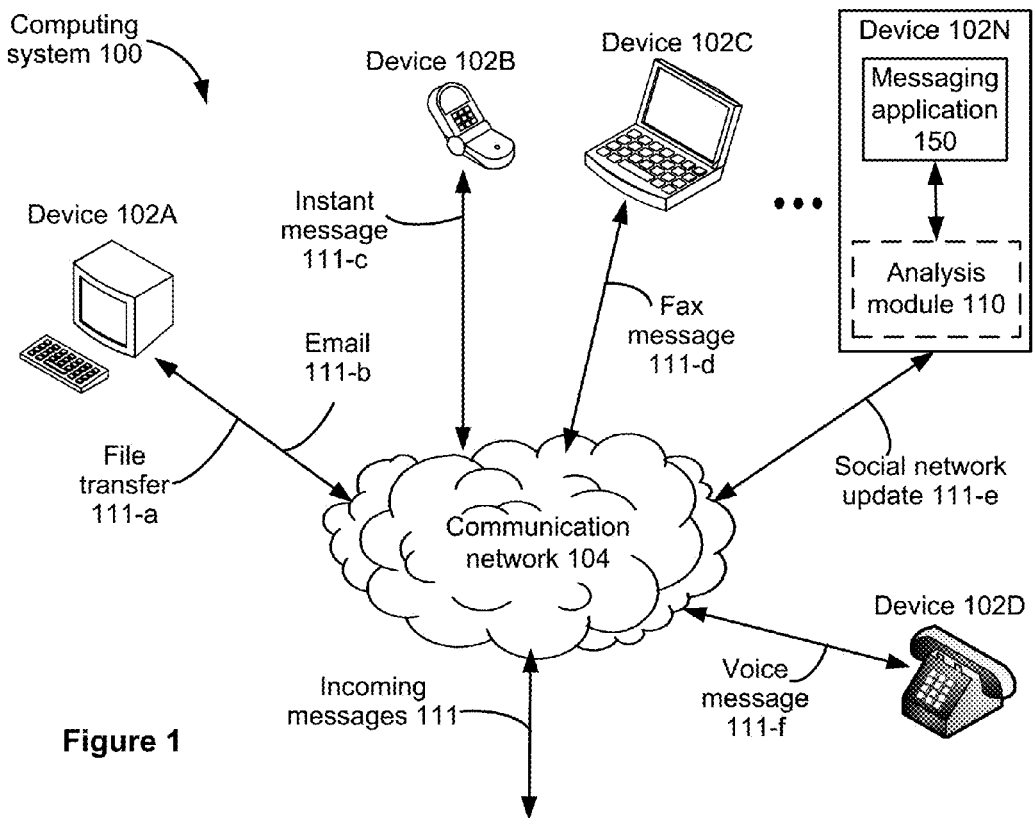
FIG. 1 is an example block diagram illustrating a computing system, in accordance with some implementations.
Figure 1:
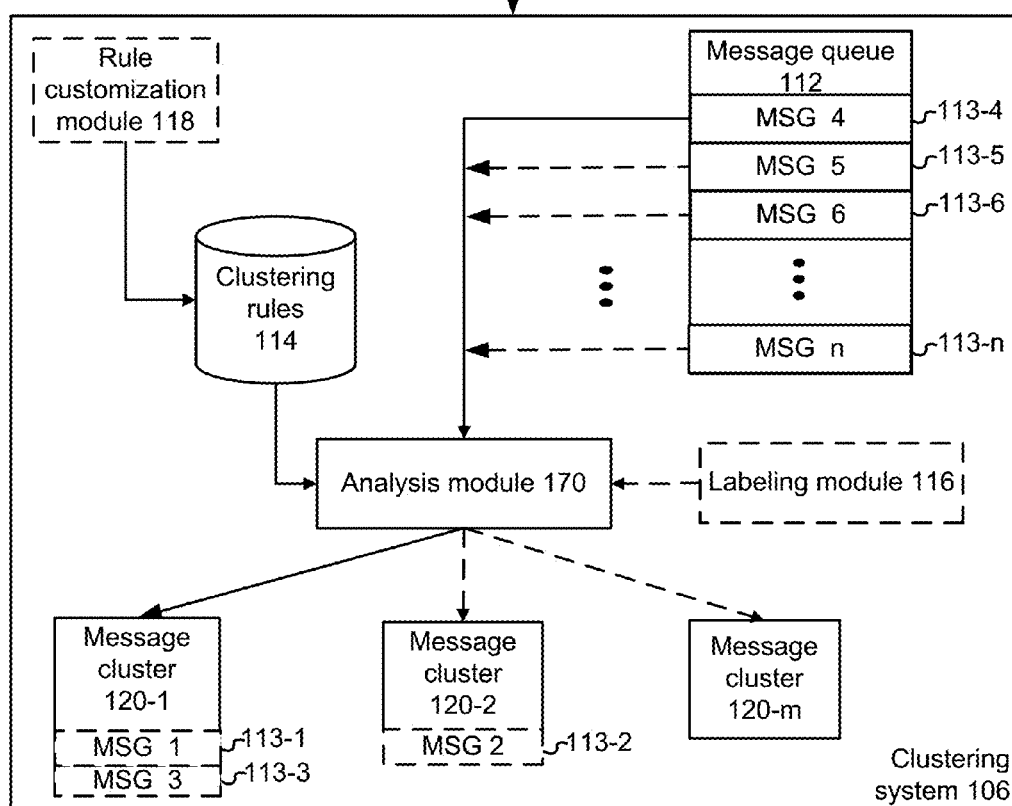

Technical solutions (e.g., computing systems, methods, and non-transitory computer readable storage mediums) for clustering electronic messages are provided in the present application.

In some implementations, a method for clustering electronic messages includes, at a computing device, analyzing content of a first incoming electronic message against a first set of content-based clustering rules associated with a first message cluster, without regard to content relatedness between the first incoming message and any messages previously assigned to the first message cluster. In some implementations, the method further includes, responsive to a determination that the first incoming electronic message satisfies the first set of content-based clustering rules: assigning the first incoming electronic message to the first message cluster, and formatting for display, in an electronic message folder, electronic messages in the first message cluster as a first single cluster graphic.

In some implementations, the first message cluster includes a first plurality of electronic messages, the first plurality of electronic messages includes the first incoming electronic message, and the electronic message folder further includes a second plurality of electronic messages. The method further includes, responsive to a predefined user action in connection with the first single cluster graphic: expanding display of the first cluster graphic, by: while maintaining display of information representing the second plurality of electronic messages, formatting for display content of an electronic message in the first plurality of electronic messages.

In some implementations, the first message cluster includes a first plurality of electronic messages, the first plurality of electronic messages includes the first incoming electronic message, and the electronic message folder further includes a second plurality of electronic messages. The method further includes, responsive to a predefined user action in connection with the first single cluster graphic: expanding display of the first plurality of electronic messages, by: while maintaining display of information representing the second plurality of electronic messages, formatting for display a listing of each message in the first plurality of electronic messages.

In some implementations, the first set of content-based clustering rules is specified without user intervention.

In some implementations, the first set of content-based clustering rules is user specified.

In some implementations, the first message cluster includes a first plurality of electronic messages; the first plurality of electronic messages includes the first incoming electronic message. And the method further comprise, responsive to a predefined user action with respect to the first single cluster graphic; causing the predefined user action to be applied to each electronic message in the first plurality of electronic messages.

In some implementations, the first incoming electronic message further satisfies a second set of content-based clustering rules associated with a second message cluster. And the method further comprises, forgoing association of the first incoming electronic message with the second message cluster.

In some implementations, the first and second set of content-based clustering rules are system-defined clustering rules.

In some implementations, the first incoming electronic message further satisfies a second set of content-based clustering rules associated with a second message cluster. And the method further comprises, assigning the first incoming electronic message to the second message cluster, and formatting for display, in the electronic message folder, the electronic messages in the second message cluster as a second single cluster graphic.

In some implementations, the first and second sets of content-base clustering rules are user-defined clustering rules.

In some implementations, (i) the first set of content-based clustering rules are system-defined clustering rules; and (ii) the second set of content-based clustering rules are user-defined clustering rules.

In some implementations, the electronic message folder further includes one or more individual electronic messages. And the method further comprises, responsive to a predefined user action, formatting for display the electronic message folder to a user, by: concurrently displaying to the user: (i) the first single cluster graphic; and (ii) the one or more individual electronic messages.

In some implementations, the method further comprises, responsive to a predefined user action in connection with an electronic message included in the first message cluster: disassociating the electronic message from the first single cluster graphic.

In some implementations, the method further comprises, responsive to a determination that an electronic message in the first message cluster meets predefined priority criteria: increasing a priority associated with the first message cluster graphic corresponding to the first message cluster by: formatting for display the first single cluster graphic in a visually distinctive manner.

In some implementations, a method for clustering electronic messages comprises, at a computing device having one or more processors and memory storing one or more programs for execution by the one or more processors, obtaining a first incoming electronic message associated with a first cluster identifier. The first message cluster identifier is determined by: analyzing content of the first incoming electronic message against a first set of content-based clustering rules associated with a first message cluster without regard to content relatedness between the first incoming message and any messages previously assigned to the first message cluster. The method further includes, responsive to a determination that the first incoming electronic message satisfies the first set of content-based clustering rules: associating the first cluster identifier with the first incoming electronic message; and displaying, in an electronic message folder, electronic messages in the first message cluster, as a first single cluster graphic. The electronic messages are assigned to the first message cluster in accordance with cluster identifiers associated with the electronic messages.

In some implementations, the first message cluster includes a first plurality of electronic messages; the first plurality of electronic messages includes the first incoming electronic message; and the electronic message folder further includes a second plurality of electronic messages. And the method further comprises, responsive to a predefined user action in connection with the first single cluster graphic: expanding display of the first cluster graphic, by: while maintaining display of information representing the second plurality of electronic messages, displaying content of an electronic message in the first plurality of electronic messages.

In some implementations, the first message cluster includes a first plurality of electronic messages; the first plurality of electronic messages includes the first incoming electronic message; and the electronic message folder further includes a second plurality of electronic messages. And the method further comprises, responsive to a predefined user action in connection with the first single cluster graphic: expanding display of the first plurality of electronic messages, by: while maintaining display of information representing the second plurality of electronic messages, displaying a listing of each message in the first plurality of electronic messages.

In some implementations, the first set of content-based clustering rules is specified without user intervention.

In some implementations, the first set of content-based clustering rules is user specified.

In some implementations, the first message cluster includes a first plurality of electronic messages, the first plurality of electronic messages includes the first incoming electronic message. And the method further comprises, responsive to a predefined user action with respect to the first single cluster graphic; causing the predefined user action to be applied to each electronic message in the first plurality of electronic messages.

In some implementations, the first incoming electronic message further satisfies a second set of content-based clustering rules associated with a second message cluster, and the method further comprises, forgoing display of the first incoming electronic message in the second message cluster.

In some implementations, the first and second set of content-based clustering rules are system-defined clustering rules.

In some implementations, the first incoming electronic message further satisfies a second set of content-based clustering rules associated with a second message cluster, and the first incoming electronic message is also associated with a second message cluster identifier corresponding to the second message cluster. In some implementations, the method further comprises: displaying, in the electronic message folder, the electronic messages in the second message cluster as a second single cluster graphic.

In some implementations, the electronic message folder further includes one or more individual electronic messages; the method further comprises: responsive to a predefined user action, displaying the electronic message folder to a user, by: concurrently displaying to the user (i) the first single cluster graphic and (ii) the one or more individual electronic messages.

In some implementations, the method further comprises, responsive to a predefined user action in connection with an electronic message included in the first message cluster: ceasing display the electronic message as part of the first single cluster graphic.

In some implementations, the method further comprises, responsive to a determination that an electronic message in the first message cluster meets predefined priority criteria: formatting for display the first single cluster graphic in a visually distinctive manner.

In other aspects of the present disclosure, computing systems and non-transitory computer storage mediums for executing one or more steps of the above-described methods are also disclosed.

DETAILED DESCRIPTION

The implementations described herein provide various technical solutions to improving access to electronic messages, and in particular to the above-identified problems, by providing techniques for clustering electronic messages and for displaying clustered messages to a user.

As a non-limiting example, after obtaining a string of emails (e.g., MSG 1, MSG 2, and MSG 3), a clustering system analyzes each of these emails for clustering purpose. In some cases, starting with MSG 1, the clustering system analyzes its content against a set of content-based clustering rules. In some cases, the content analysis of MSG 1 includes: (a) searching for various keywords (e.g., "deal," "itinerary," "profile") within different components of MSG 1 (e.g., message body, attachment, header, and subject line); and (b) analyzing search results in accordance with content-based clustering rules (e.g., "whether the body of an email includes the term 'Deal' more than 3 times."). And, based on outcome of the analysis, MSG 1 is assigned to one or several categories (also referred to herein as content categories) (e.g., the "Travel" category and/or the "Promotion" category). MSG 2 and MSG 3 are similarly analyzed and also assigned categories.

Next, based on a category to which an email has been assigned (e.g., the "Travel" category, the "Promotion" category, or both), the clustering system formats these categorized emails for display to a user. For example, emails within the "Travel" category (e.g., flight tickets, rental car receipts, and hotel reservations) are displayed as a group, within a geometric shape encompassing the group; while emails within the "Promotion" category (e.g., an discounted Oktoberfest ticket, an invite to join the NYC restaurant week, a GOOGLE SHOPPING coupon, and an offer for a discounted ANDROID phone) are displayed as another group within another geometric shape.

Providing at least these technical effects, the proposed technical solutions described in the present application reduce or eliminate the above-identified technical problems in at least the following ways.

First, emails including different types of content and thus assigned to different content categories (e.g., clusters) are displayed concurrently, thereby providing, concurrently, a categorized view of a particular subset of emails (e.g., emails within the "Travel" cluster), as well as a comprehensive overview of a message folder (e.g., an email inbox), which usually include emails across different categories (e.g., emails within the "Travel" cluster, and those within the "Promotion" cluster). Second, emails including the same type of content (and thus assigned to the same cluster) are automatically integrated together for ease of reference.

Additional details of implementations are now described in relation to the Figures.

FIG. 1 is a block diagram illustrating a computing system 100, in accordance with some implementations.

In some implementations, the computing system 100 includes one or more devices 102 (e.g., device 102A, 102B, 102C, 102D . . . , and 102N), a communication network 104, and a clustering system 106. In some implementations, a device 102 is a phone (mobile or landline), a computer (mobile or otherwise), a fax matching, or an audio/video recorder.

In some implementations, a device 102 obtains an electronic message from (e.g., drafted by) a user of the device 102, and transmits the electronic message to the clustering system 106 for clustering with (e.g., grouping with or separating from) other electronic messages. For example, after determining that user Jack sends an email to user Mary, the device 102 transmits the email is to the cluster system 106, which clusters messages for Mary.

In some implementations, an electronic message is a file transfer 111-$a$ (e.g., a photo, document, or video download/upload), an email 111-$b$, an instant message 111-$c$ (e.g., a GOOGLE HANGOUT message), a fax message 111-$d$, a social network update 111-$e$ (e.g., a GOOGLE PLUS update), or a voice message 111-$f$.

In some implementations, a device 102 includes a messaging application 150 and optionally an analysis module 110 (similar to that included in the clustering system 106). In some implementations, the messaging application 150 processes incoming and outgoing electronic messages into and from the device 102, such as an outgoing email sent by a user of the device 102 to another user, and a chat message by another user to a user of the device 102. In some implementations, the analysis module 110 resident on the device 102 balances processing load with the analysis module 110 resident on the clustering system 106. For example, after a user requests to send out a total of 6 emails, the analysis module 110 on the device 102 processes the first three emails (which include plain text emails, e.g., without HTML content or attachments, and thus might require less processing power), and the analysis module 110 on clustering system 106 processes the remaining three emails (which include HTML content or attachments, and thus might require more processing power).

In some implementations, the communication network 104 interconnects one or more devices 102 with each other, and with the clustering system 106. In some implementations, the communication network 104 optionally includes the Internet, one or more local area networks (LANs), one or more wide area networks (WANs), other types of networks, or a combination of such networks.

In some implementations, the clustering system 106 includes an analysis module 110, a message queue 112, a collection of (e.g., content-based) clustering rules 114 (e.g., user- or system-provided rules), optionally a labeling module 116, and optionally a rule customization module 118.

In some implementations, the clustering system 106 analyzes content of incoming electronic messages (e.g., incoming messages 111), and assigns these electronic messages to one or more clusters (e.g., content categories, such as message clusters 120-1, 120-2 . . . 120-$m$). For example, after analyzing the message body of an email (e.g., MSG 1, MSG 2, and MSG 3), the clustering system 106 determines (e.g., with a 90% confidence level) that the email is a "Promotion" email (e.g., an email with advertising materials), and accordingly assigns the email to the "Promotion" cluster. In some implementations, assigning an email to a message cluster includes assigning a label (a "Promotion" or "Travel" label) that represents the message cluster, e.g., using the labeling module 116.

Figure 8A:
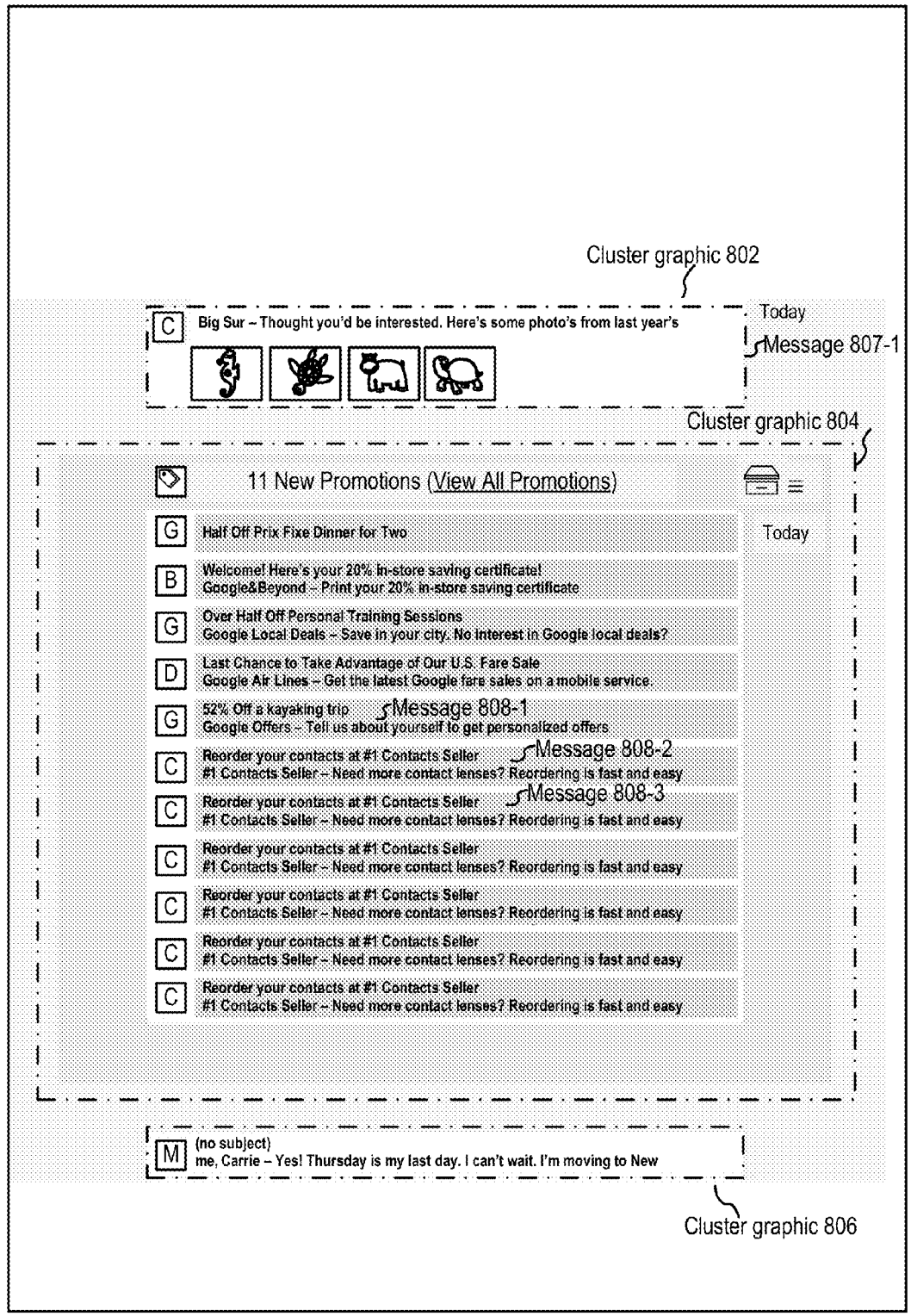
FIGS. 8A-8D are screen images showing an example user interface for displaying clustered electronic messages, in accordance with some implementations.

In some implementations, the analysis module 110 analyzes content of an electronic message against content-based clustering rules. For example, the analysis module 110 conducts a keyword search (e.g., a search of the term "deal" or the phrase "low price") within various content components (e.g., message body, subject line, sender/recipient, and header section) of an electronic message, and then analyzes search results using content-based clustering rules (e.g., whether the term "deal" appears more than 3 times within the body of an email, or whether the phrase "low price" appears within the subject line of a fax message). In some implementations, based on the analysis results, the analysis module 110 assigns an electronic message to one or more clusters; e.g., after determining that the term "deal" appears more than 4 times in the message body of an email and that the term "travel" appears in the subject line of the email, the analysis module 110 assigns the email to both the "Promotion" cluster and the "Travel" cluster. In some implementations, as explained in the above example, an electronic message can be assigned to more two or more clusters. These approaches are advantageous, because sometimes an electronic message can be reasonably (e.g., objectively) considered as falling into two or more content categories. For example, an email promoting a discount cruise trip may be considered by some users as relevant to both "Travel" and "Promotion"; as such, the email may appear in both the "Travel" cluster graphic and the "Promotion" cluster graphic. In some implementations, however, an electronic message is assigned to one message cluster only. For example, as shown in FIG. 8A, the message 807-1 only appears in the "Travel" cluster graphic 802, but not in the "Promotion" cluster graphic 804. These approaches are also advantageous, because user access may be simplified and user confusion minimized, when an electronic message is assigned to a single cluster and thus displayed within only a single cluster graphic (e.g., the message do not appear in any other cluster graphics).

In some implementations, the analysis module 110 is a software or hardware component resident on the device 102, such as a software package/application or a hardware chipset, for clustering messages. In other implementations, the analysis module 110 is a separate or independent from the device 102 (e.g., a GOOGLE mail clustering/processing server that is connected with but not part of the device 102).

Figure 4:
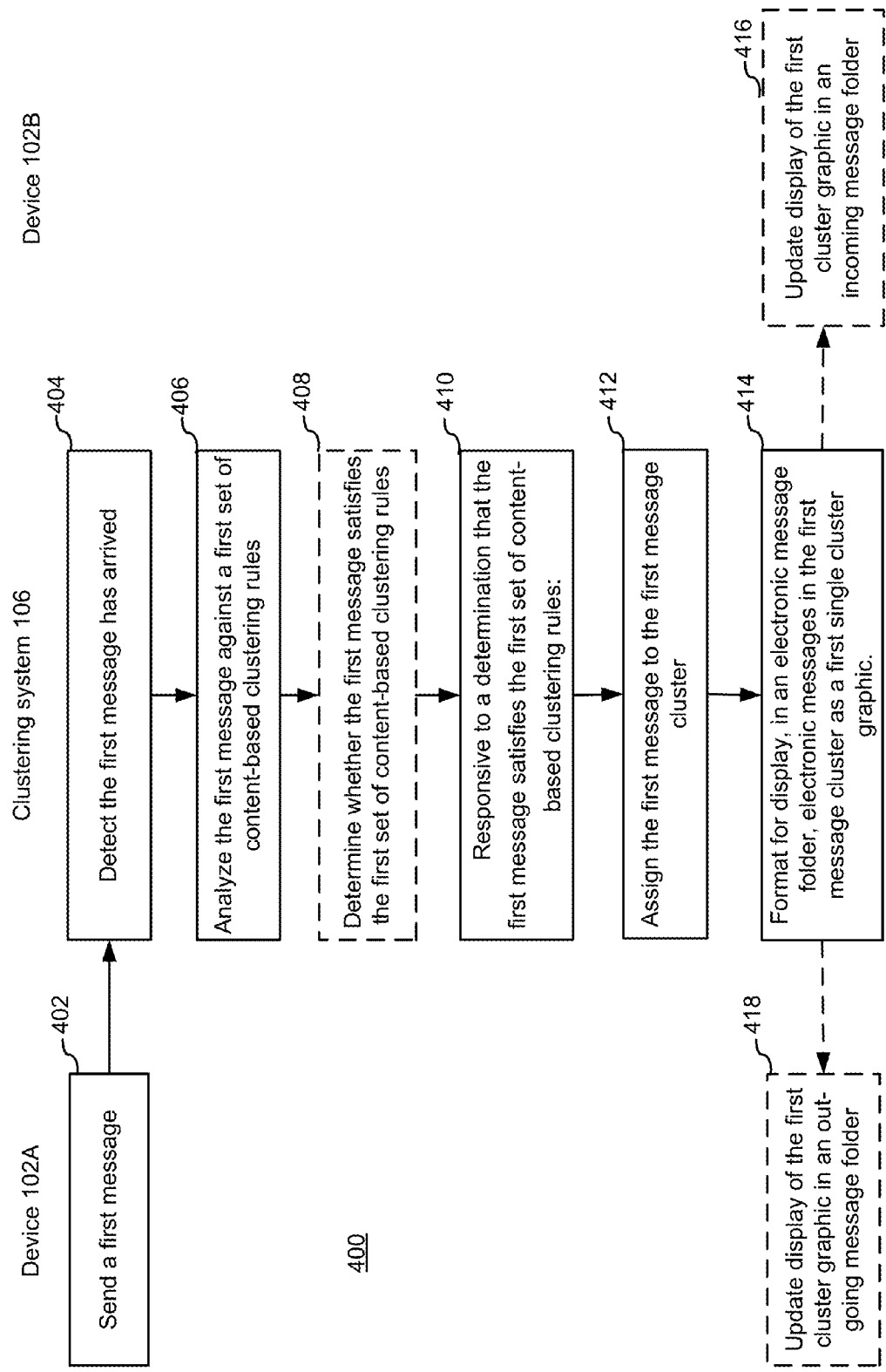
FIG. 4 is an example flow chart illustrating a method for clustering electronic messages in a computing system, in accordance with some implementations.

In some implementations, the message queue 112 stores one or more electronic messages awaiting analysis by the analysis module 110, such as MSG 4, MSG 5, MSG 6, . . . and MSG n (FIG. 1, 113-4 . . . **113-*n*). In some implementations, the message queue 112 includes different types of electronic messages, such as a file transfer 111-*a* (e.g., a photo, document, or video upload), an email 111-*b*, an instant message 111-*c* (e.g., a Google HANGOUT message), a fax message 111-*d*, a social network update 111-*e* (e.g., a GOOGLE PLUS update), or a voice message 111-*f***.

In some implementations, the collection of (e.g., content-based) clustering rules 114 include system- and user-specified clustering rules. In some implementations, system-provided rules are determined by the clustering system 160 (e.g., default clustering rules), and user-specified rules are customized (e.g., added, removed, or modified) by a user.

In some implementations, the labeling module 116 labels an electronic message using a flag in accordance with to which cluster(s) the electronic message has been assigned. For example, after an email is assigned to both the "Travel" cluster and the "Promotion" cluster, the labeling module 116 assigns both the label "Travel" and the label "Promotion" to the email. These approaches are advantageous, because message labels may simplify searches and selective retrievals of electronic messages, e.g., emails may be searched, and voice message retrieved, both using labels.

In some implementations, a rule customization module 118 enables a user to customize (e.g., add, remove, and modify) clustering rules within the collection of clustering rules 114. These approaches enable customizing clustering results to a user's specific need. For instance, users residing on the 48 continental U.S. states may consider an email having the term "Alaska" a "Travel" email (e.g., an email with top-rated Alaska destinations) or a "Promotion" email (e.g., an email including promotional materials for trips to Alaska); users residing in the state of Alaska, however, might consider such email "Local" in nature and classify as such. In some implementations cases, therefore, a user can modify an existing clustering rule to fit his/her own needs. Continuing with the above example, in some cases, a user living Alaska can modify clustering rules 114 such that electronic messages including the term "Alaska" are assigned to the "Local" cluster—rather than the "Promotion" cluster or the "Travel" cluster, as users living in the lower 48 states may do. In some embodiments, this example is address in system-defined rules by examining the geographic source or geographic destination of the electronic message, or by otherwise determining a way to associate a geographic location with the electronic message (e.g., by recognizing an address within the message) and applying a geographic dependent clustering rule to the message. In some embodiments, the geographic source or geographic destination is approximated based on an origination IP address or a destination IP address. To illustrate, if a geographic destination for a respective electronic message is within the continental U.S. the term "Alaska" within the message is used to assign the electronic message to the "Travel" cluster.

Figure 2:
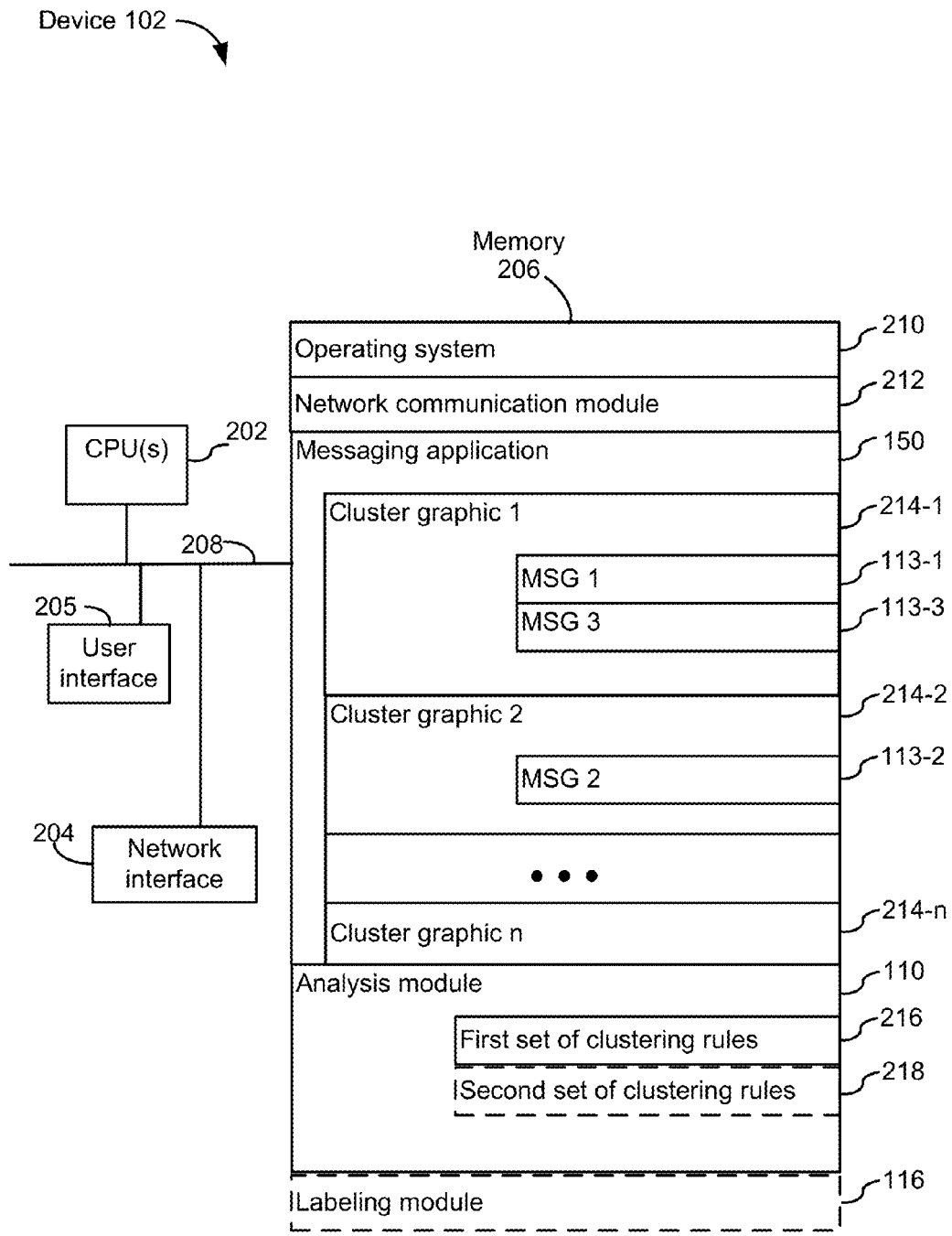
FIG. 2 is an example block diagram illustrating a computing device, in accordance with some implementations.

FIG. 2 is a block diagram illustrating a computing device 102, in accordance with some implementations. The device 102 in some implementations includes one or more processing units CPU(s) 202 (also referred to as processors), one or more network interfaces 204, a user interface 205, a memory 206, and one or more communication buses 208 for interconnecting these components. The communication buses 208 optionally include circuitry (sometimes called a chipset) that interconnects and controls communications between system components. The memory 206 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 206 optionally includes one or more storage devices remotely located from the CPU(s) 202. The memory 206, or alternatively the non-volatile memory device(s) within the memory 206, comprises a non-transitory computer readable storage medium. In some implementations, the memory 206 or alternatively the non-transitory computer readable storage medium stores the following programs, modules and data structures, or a subset thereof:

an operating system 210, which includes procedures for handling various basic system services and for performing hardware dependent tasks;

a network communication module (or instructions) 212 for connecting the device 102 with other devices (e.g., the clustering system 106 and the devices 102B . . .

102N) via one or more network interfaces 204 (wired or wireless), or the communication network 104 (FIG. 1);

a user interface module 214 for displaying user interface components or controls (e.g., textbox, button, radio button, drop-down list) to a user;

a messaging application 150 for processing and displaying incoming and outgoing electronic messages, e.g., using cluster graphics, including:

a cluster graphic 1 (214-1) that visually clusters (e.g., groups together) MSG 1 (113-1) and MSG 3 (113-1)—both of which have been assigned to message cluster 1;

a cluster graphic 2 (214-2) that visually clusters (e.g., groups together) MSG 2 (113-2)—which has been assigned to message cluster 2; and a cluster graphic n (214-n) that visually clusters (e.g., groups together) electronic messages that have been assigned to message cluster n;

optionally an analysis module 110 for analyzing content of (e.g., income and outgoing) electronic messages, and assigning electronic messages to one or more message clusters (e.g., content categories) in accordance with therewith; and optionally a labeling module 116 for labeling an electronic message in accordance with clustering result therefor, and assisting search of electronic message using labels (e.g., search all "Travel" emails—emails that have been assigned to the "Travel" cluster and thus labeled as "Travel" emails).

In some implementations, the user interface 205 includes an input device (e.g., a keyboard, a mouse, a touchpad, a track pad, and a touch screen) for a user to interact with the device 102.

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 206 optionally stores a subset of the modules and data structures identified above. Furthermore, the memory 206 may store additional modules and data structures not described above.

Figure 3:
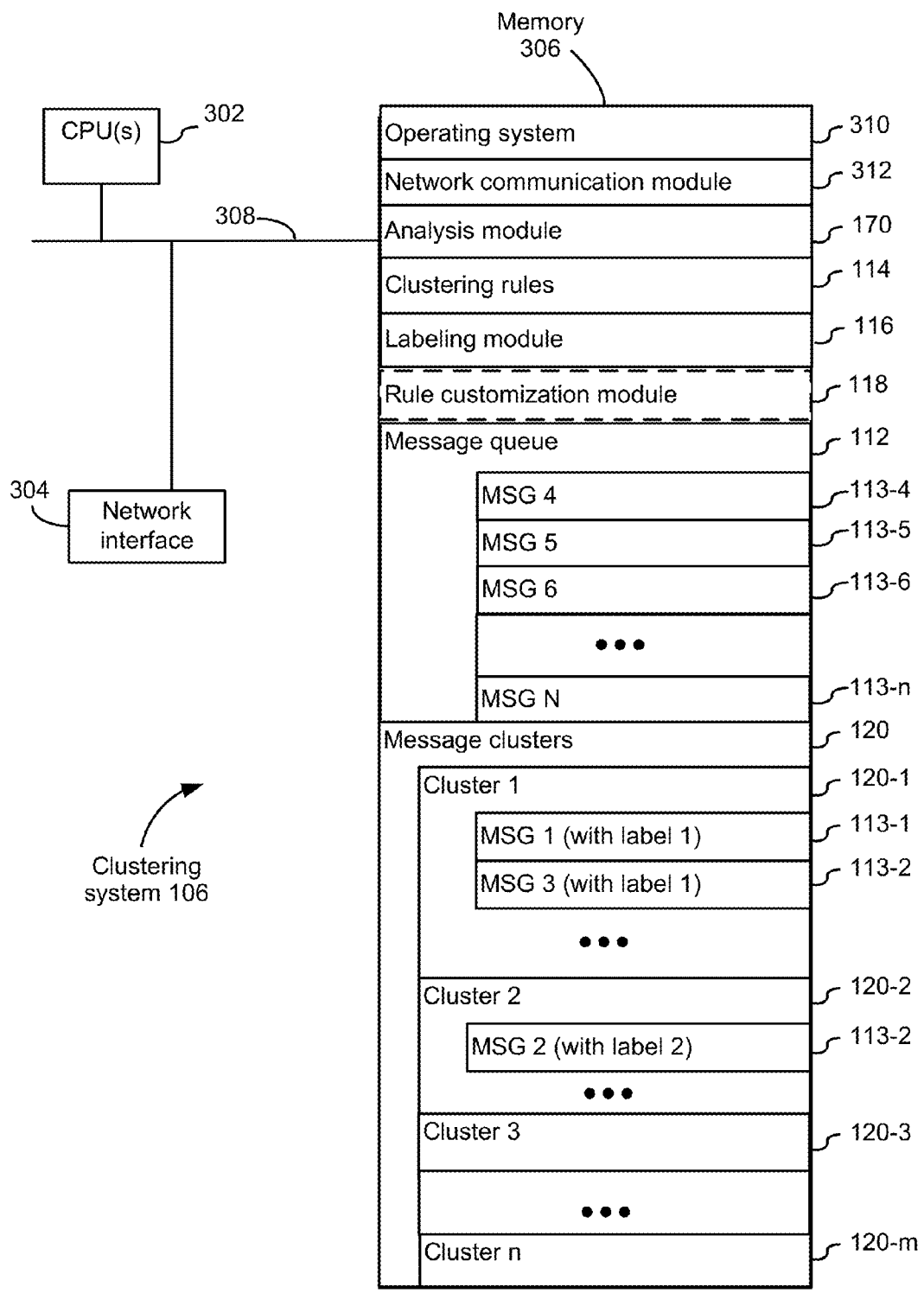
FIG. 3 is an example block diagram illustrating a clustering system, in accordance with some implementations.

FIG. 3 is a block diagram illustrating a clustering system 106, in accordance with some implementations. The clustering system 106 typically includes one or more processing units CPU(s) 302 (also referred to as processors), one or more network interfaces 304, memory 306, and one or more communication buses 308 for interconnecting these components. The communication buses 308 optionally include circuitry (sometimes called a chipset) that interconnects and controls communications between system components. The memory 306 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 306 optionally includes one or more storage devices remotely located from CPU(s) 302. The memory 306, or alternatively the non-volatile memory device(s) within the memory 306, comprises a non-transitory computer readable storage medium. In some implementations, the memory 306 or alternatively the non-transitory computer readable storage medium stores the following programs, modules and data structures, or a subset thereof:

an operating system 310, which includes procedures for handling various basic system services and for performing hardware dependent tasks;

a network communication module (or instructions) 312 for connecting the clustering system 106 with other devices (e.g., the devices 102) via the one or more network interfaces 304 (wired or wireless), or the communication network 104 (FIG. 1);

an analysis module 180 for conducting a content-based analysis on (e.g., income and outgoing) electronic messages and assigning electronic messages to one or more clusters in accordance with the content based analysis (e.g., content categories);

a message queue 112 for storing electronic messages awaiting processing by the analysis module 110, e.g., MSG 4, MSG 5, MSG 6, . . . and MSG n (113-4 . . . 113-n);

a collection of content-based clustering rules 114, which specify or determines, e.g., with a predefined degree of certainty, one or more clusters (e.g., content categories) to which an electronic message belongs;

optionally a labeling module 116 for labeling an electronic message in accordance with clustering result therefor, and assisting search of electronic message using labels (e.g., search all "Travel" emails—emails that have been assigned to the "Travel" cluster and thus labeled as "Travel" emails).

a rule customization module 118 for enabling a user to customize (e.g., add, remove, and modify) the collection of content-based clustering rules 114; and one or more message clusters 120 for storing or representing electronic messages assigned thereto, which include:

cluster 1 (120-1, e.g., the "Travel" cluster) for representing (e.g., grouping together) electronic messages assigned thereto, which include:
MSG 1 (e.g., with label 1); and
MSG 3 (e.g., with label 1);

cluster 2 (120-2, e.g., the "Promotion" cluster) for representing (e.g., grouping together) electronic messages assigned thereto, which include:
MSG 2 (e.g., with label 2);

cluster 3 (120-3, e.g., the "Primary" cluster) for representing (e.g., grouping together) electronic messages assigned thereto; and cluster n (120-n, e.g., the "Social" cluster) for representing (e.g., grouping together) electronic messages assigned thereto.

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 306 optionally stores a subset of the modules and data structures identified above. Furthermore, the memory 306 may store additional modules and data structures not described above.

Although FIGS. 2 and 3 show a "device 102" and a "clustering system 106," respectively, FIGS. 2 and 3 are intended more as functional description of the various features which may be present in computer systems than as a structural schematic of the implementations described herein. In practice, and as recognized by those of ordinary skill in the art, items shown separately could be combined and some items could be separated.

FIG. 4 is a flow chart illustrating a method for clustering electronic messages in a computing system, e.g., implemented at device 102, at the clustering system 106, in accordance with some implementations.

In some implementations, the device 102A sends (402) a first electronic message to the device 102B, via the cluster system 106.

In some implementations, after detecting (404) that the first message has arrived, the clustering system analyzes (406) the first message against a first set of content-based clustering rules.

In some implementations, the clustering system 106 determines (408) whether the first message satisfies, e.g., to a predefined threshold degree, the first set content-based clustering rules. In some implementations, such determination is made by another computing device, such as a remote mail server or a dedicated computing server.

In some implementations, responsive (410) to a determination that the first message satisfies the first set of content-based clustering rules, e.g., to a predefined extent (e.g., the first message satisfies 6 out of 10 rules specified in the first set of clustering rules), the clustering system 106 assigns (412) the first message to the first message cluster.

In some implementations, in accordance with clustering results, the clustering system 106 formats for display (e.g., resolution/size/font/position/contrast adjustments), in an electronic message folder, electronic messages in the first message cluster as a first single cluster graphic. For example, messages 808-1, 808-2, and 808-3 are grouped and displayed together as within a group (e.g., the cluster graphic 804).

Figure 5A:
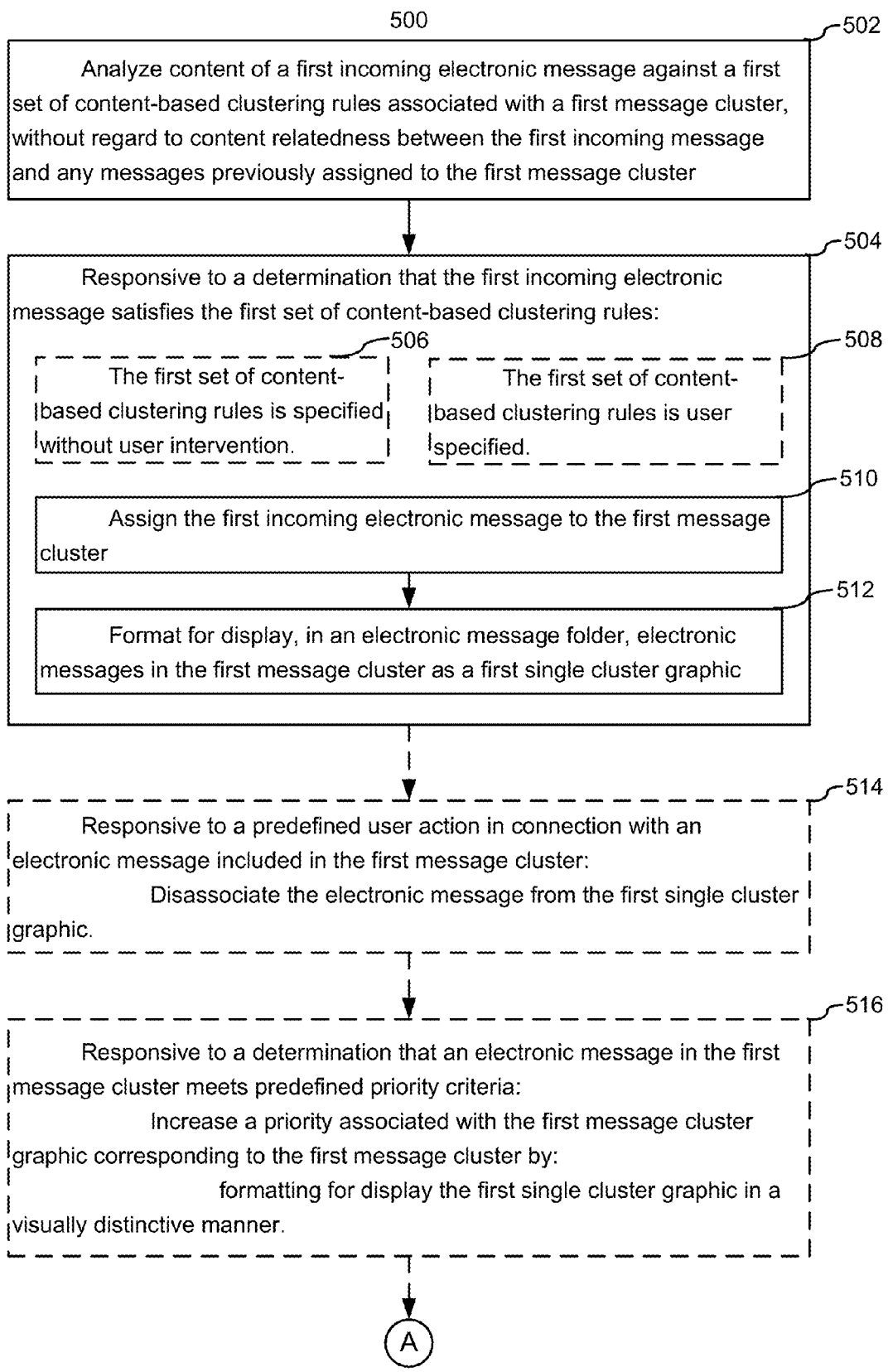
FIGS. 5A-5C are example flow charts illustrating methods 500 for clustering electronic messages, in accordance with some implementations.
Figure 5B:
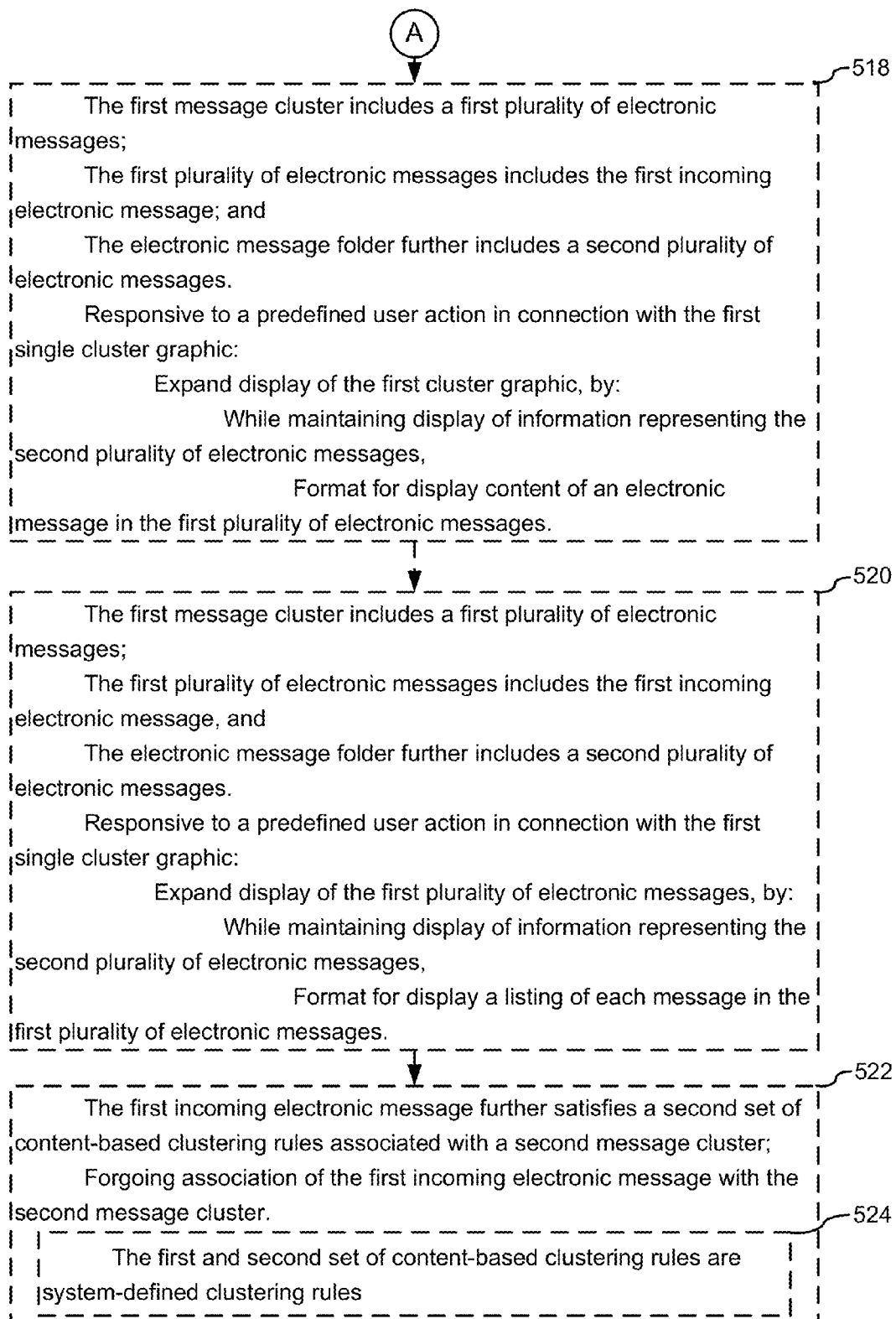
Figure 5C:
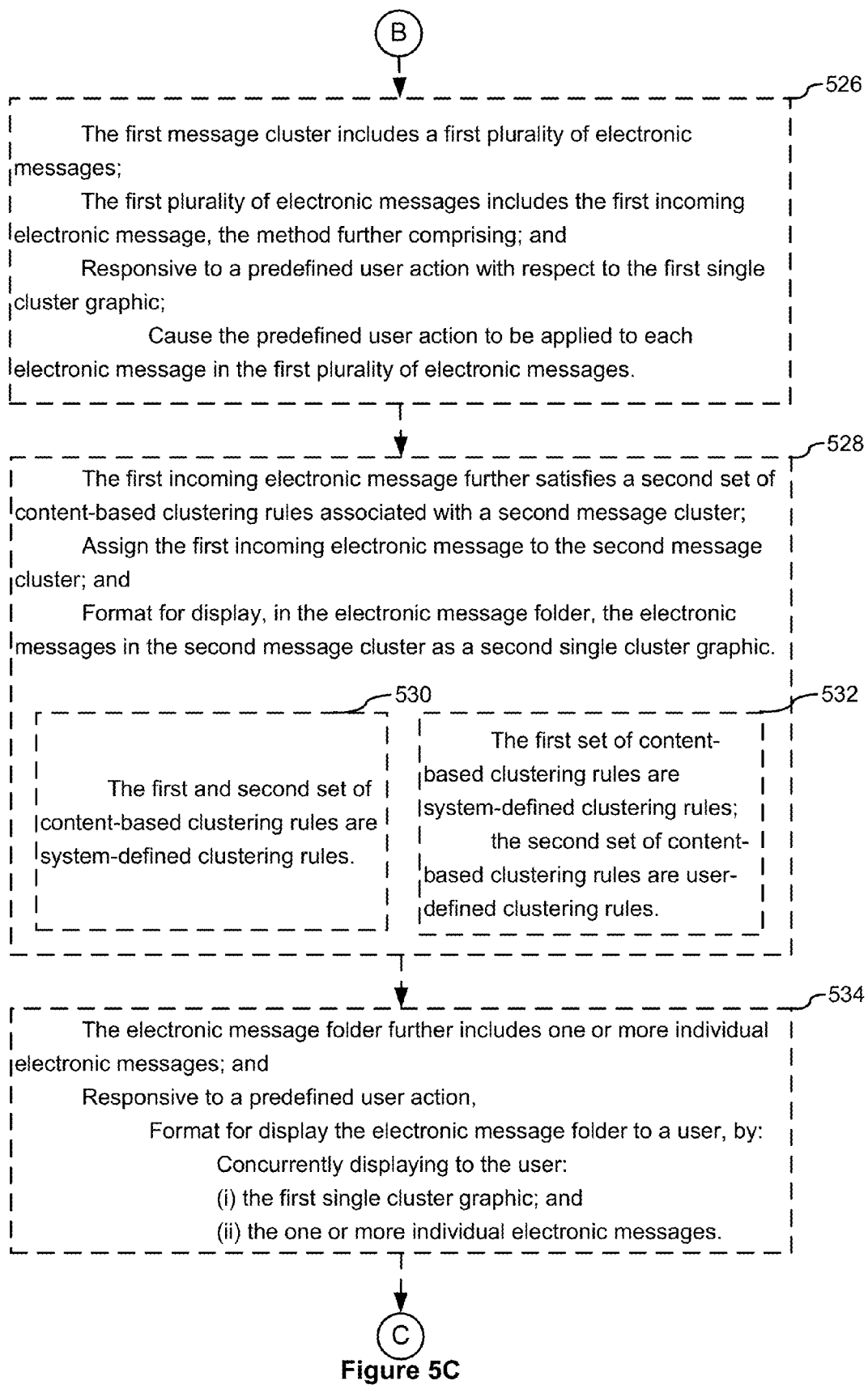

FIGS. 5A-5C are example flow charts illustrating a method 500 for clustering electronic messages, in accordance with some implementations. In some implementations, the method 500 for clustering electronic messages is performed at a computing system, e.g., the clustering system 106. In some implementations, the clustering system 106 includes one or more processors and memory storing one or more programs for execution by the one or more processors.

In some implementations, after obtaining a first incoming electronic message, the clustering system 106 analyzes (502) content of the first incoming electronic message against a first set of content-based clustering rules associated with a first message cluster, without regard to content relatedness between the first incoming message and any messages previously assigned to the first message cluster.

For example, after obtaining a portion of (or entire) content of three messages (MSG 1, MSG 2, and MSG 3), the clustering system 106 compares the content of MSG 1 (or the portion thereof) against a set of content-based rules (e.g., promotional content rules—which identifies a message as promotional in nature or as including promotional materials (e.g., targeted or untargeted advertisements), and determines whether MSG 1 meets a threshold number of criteria specified by content-based rules (e.g., whether MSG 1 meets 5 out of a total number of 10 rules in the set of rules).

In some implementations, when the clustering system determines that MSG 1 meets the threshold number of criteria specified by the first set of content-based rules (e.g., promotional content rules), the clustering system identifies (e.g., specifies, classifies, or labels) MSG 1 to be a promotional message (e.g., a realtor's news letter informing potential buyers of real properties that are currently for sale in Palo Alto, Calif.; or an invite to subscribe to a news magazine at a discounted rate). In some implementations, such a determination (specification, classification, or labeling) is accompanied by associating (also called labeling or tagging) MSG 1 with a message label representing the determination (e.g., a "Promotion" label).

In some implementations, such a message label is accessible (e.g., visually observable) to a user, so that a user can manage electronic messages using the label. For example, after receiving a user action with respect to the "Promotions" label (e.g., a mouse selection, a combination of key strokes on a keyboard, or a voice command received through a microphone), the clustering system 106 identifies all messages (or a predefined number of messages, e.g., so as not to appear overwhelming) associated with that label, and formatting these identified messages for display to a user.

In other implementations, such a message label is for system's use only (e.g., a database field/flag not accessible to a user or a user application), and thus unavailable to a user (e.g., not accessible or observable by a user).

In some implementations, the first set of content-based rules includes rules relating to message body of an electronic message. For instance, what words, phrases, and symbols are included in the body of an electronic message, e.g., whether a voice mail includes the phrase "Good Deal"; whether an email includes the symbol "$" (suggestive of a price) or "@" (indicative of an email address) more than 5 times; and whether an instant message (e.g., a chat message) includes both the word "OFFER" (e.g., case sensitive) and the word "expire" (e.g., not case sensitive). For another instance, what types or categories of content are included in the body of an electronic message, e.g., whether an email includes more multimedia content (e.g., images, audios, and videos) than (e.g., plain, and HTML or the like) text; and whether an email includes a large number of references to additional content external to the email (e.g., embedded URLs to advertising images residing on a remote server). For still another instance, whether an electronic message includes an option to unsubscribe, e.g., because sometimes legal considerations require that electronic messages with promotional content (e.g., marketing emails and cold call for insurance quotes) provide an option to unsubscribe. For still a further instance, whether an electronic message includes means for contacting a merchant, e.g., a phone number for a customer service representative at a pan email address for returns and exchanges at a local department store.

In some implementations, the first set of content-based rules further includes rules relating to other components of an electronic message, e.g., the subject line, name(s) of intended recipients(s), email(s) of intended recipients(s), total number of intended recipient(s) (e.g., a large number of intended recipient is indicative of a "Promotion" message), name of a sender (e.g., "GOOGLE OFFER"), email address of a sender (e.g., "Offer@google.com"), timestamps (e.g., originating or receipt, because spammers are sometimes known to send spam emails at certain time range, e.g., early hours each day); and header information (e.g., originating IP address, delivery path, intermediary SMTP addresses, a total number of hops an email has traveled before delivered, because certain geographical regions are known originations of spam emails).

Note that the above-described analysis of MSG 1 under the promotional content rules is conducted—without regard (or reference) to content of MSG 2 (or a portion thereof). Stated in another way, the determination that MSG 1 is a promotional message is rendered, sometimes, without analyzing content of MSG 2—even though MSG 2 and MSG 1 may be considered related in some ways, e.g., (1) MSG 2 is a direct or indirect reply to MSG 1, (2) MSG 1 arrives before, after, or substantially contemporaneously with MSG 2, (3) both MSG 1 and MSG 2 share the same subject line, the same timestamp (receipt or send), the same author, the same intended recipient(s), the same priority level, the same signature block, the same originating IP address, or the same size; and (4) MSG 2 includes a predefine portions of MSG 1 as original or quoted text, e.g., as a result of a user's copy-and-paste of MSG 1 (or a portion thereof) into MSG 2, or of an email system's automatically (and thus without human intervention) inclusion of MSG 1 (or a portion thereof) as part of MSG 2. These approaches are advantageous, because they analyze and focus on each message individually, thereby minimizing potentially distracting elements arising from unpredictable user behaviors. For instance, after receiving a "Promotion" email (MSG 1), a user might reply (to MSG 1, an "Promotion" email) with content that may be considered unrelated to "Promotion," such as a snippet (e.g., several sentences) concerning her recent social network status updates, which may be considered "Social" in nature. In these situations, analyzing MSG 2 individually may lead to a (in this example, better) determination that MSG 2 is a "Social" email, rather than a "Promotion" email, notwithstanding that MSG 2 is technically a reply to MSG 1 (a "Promotion" email).

Also note that although MSG 1 and MSG 2 may both eventually be determined (e.g., classified or labeled) as promotional messages, these determinations are rendered independent from each other: Because both (A) the analysis of MSG 1 under the promotional content rules, and (B) the subsequent determination that MSG 1 is indeed a promotional message are carried out—without regard to both the analysis (A) and the determination (B) of MSG 2 (e.g., the content of MSG 2), and vice verse.

Further note that, because the analysis of MSG 1 against the first set of rules and that of MSG 2 against the first set of rules are independent from each other (e.g., performed in parallel or contemporaneously), in some case, the outcomes thereof would also differ. For example, when MSG 1 is an email inquiry by user 1 to user 2 about travel photos user 2 recently uploaded onto her GOOGLE PICASA page; and MSG 2 is a direct reply by user 2 that includes a significant portion of her travel itinerary, MSG 1 may be determined as relating to social network activities (e.g., labeled as "Social"); while MSG 2 may be determined as relating to travel activities (e.g., labeled as "Travel"), but not relating to social network activities (e.g., not label as "Social"), although sometimes MSG 1 and MSG 2 are considered belonging to a same conversation (e.g., a GOOGLE email conversation), due to that MSG 1 is a direct reply to MSG 2.

Notwithstanding the above, in some implementations, the content analysis of MSG 1 under the promotional content rules is conducted with—rater than without—regard (or reference) to content of MSG 2 (or a portion thereof). Stated in another way, the determination that MSG 1 is a promotional message, in some case, is rendered based at least in part on a logical relation between MSG 1 and MSG 2 or on information relating to MSG 2 (e.g., its content, header, sender/recipient, and timestamps): For example (1) both MSG 1 and MSG 2 are determined as "Promotion" emails, when MSG 1 is a "Promotion" email and MSG 2 is a direct or indirect reply or follow up to MSG 1; (2) both MSG 1 and MSG 2 share substantially the same subject line ("Travel Deals" and "Re: Travel Deals"; respectively), the same timestamp (receipt or send), the same author, the same intended recipient(s), the same priority level, the same signature block, the same originating IP address, or the same size; and (3) MSG 2 includes a predefine portions of MSG 1 as original or quoted text, as a result of a user's copy-and-paste of MSG 1 (or a portion thereof) into MSG 2, or of an email system's automatically (and thus without human intervention) inclusion of MSG 1 (or a portion thereof) as part of MSG 2. These approaches are advantageous, because to determine (or classify) the nature of an email, they take into consideration a temporal, causal, or other logical relationships between two or more electronic messages, which might otherwise be lost or obscured when electronic messages analyzed individually (e.g., in isolation).

In some implementations, after completing the analysis of MSG 1 against the first set of rules (e.g., Promotions Rules), the computer system continues with MSG 1 (rather than moving to MSG 2 or MSG 3) by analyzing MSG 1 with a second set of content-base rules (e.g., social network content rules) which identifies a message as relating to activities relating to social networks (e.g., an invite to join a GOOGLE PLUS circle, or a summary of recently-available content on YOUTUBE.COM). In some implementations, therefore, an electronic message is identified as belong to two or more clusters (e.g., both the "Travel" cluster and the "Promotion" cluster).

In some implementations, after completing the analysis on MSG 1, the computer systems moves onto MSG 2, and begins analyzing MSG 2 and MSG 3, in parallel or in sequence, against the first set of content-based rules.

In some implementations, responsive to (504) a determination that the first incoming electronic message satisfies the first set of content-based clustering rules: the clustering system 106 assigns (510) the first incoming electronic message to the first message cluster.

In some implementations, the first set of content-based clustering rules is specified without user intervention (506). For example, the first set of content-based clustering rules includes rules defined or provided by the clustering system 106 (e.g., pre-programmed rules loaded from a rule database). In some implementations, these system-defined clustering rules are not modifiable by a user.

In some implementations, these system-defined clustering rules are customizable by a user. In some implementations, the first set of content-based clustering rules is user specified (508). As an example, the first set of content-based clustering rules includes rules defined or provided by a user (e.g., user-customized rules), via the rule customization module 118 shown in FIG. 1. As another example, a user can customize or personalize clustering rules (e.g., adding new rules and modifying or removing existing rules), e.g., in order to improve clustering accuracy and to tailor clustering rules to his or her particular needs. For instance, for a user living in a community (or at a geographical location) where the word "deal" has become an email or chat slang, the user may modify an existing clustering rule (from "an email that includes the keyword 'deal' is a promotional email" to "an email that includes the keyword 'deal'—and the keyword 'price 'at least twice—is a promotional email) in order to avoid having emails or chats from her friends classified (or misclassified) as advertisements.

In some implementations, the clustering system 106 then formats (512) for display, in an electronic message folder, electronic messages in the first message cluster as a first single cluster graphic. As an example, after determining that message 808-1 is a "Promotion" email, the clustering system causes the message 808-1 to be visually (e.g., graphically)

displayed, together with other "Promotion" messages (e.g., emails, tweets, chat messages, such as messages 808-2 and 808-3) as a single item (cluster graphic 804), e.g., a shape (rectangle, circular, or otherwise) that includes all or a portion of "Promotion" message), as shown in FIG. 8A.

Note that, in some implementations, the single cluster graphic differs from an electronic message folder (e.g., an email inbox, a spam folder, and a trash folder) in at least the following ways.

First, an email inbox includes emails of several different types or categories (e.g., both "Promotion" and "Travel" emails); whereas the single cluster graphic includes (e.g., only) emails of a particular type or category (e.g., the "Promotion" cluster graphic 804 includes "Promotion" emails, but not "Travel" email). The clustering methods described herein are therefore advantageous because it simplifies user access to a particular type or category of email. For example, a user looking for a CVS coupon attachment would only search the single cluster graphic representing (e.g., including) "Promotion" emails, rather than searching the entire email inbox, which often includes a much greater number of emails than the "Promotion" cluster does.

Second, an email inbox includes emails; whereas, in some cases, the single cluster graphic includes content other than emails, such as chat messages, tasks, and notes (e.g., all relating to "Social"). The clustering methods described herein are therefore advantageous because they provide a comprehensive access to different content having a similar nature ("Promotions" rather than "Social").

Further note that, in some implementations, the clustering process differs from a filtering process (e.g., email filters) in at least the following ways. For example, an email filter does not cause "Promotion" emails to be displayed as a single cluster graphic. As shown, in FIG. 8A, messages 808-1, 808-2, and 808-3 are all shown as within a rectangle shape surrounding the "Promotion" messages. For another example, in some cases, email filters do not specify content-based rules (e.g., a filter specifying that "all emails arrived between today and Monday next week are to be achieved without delivery to inbox first").

Figure 8B:
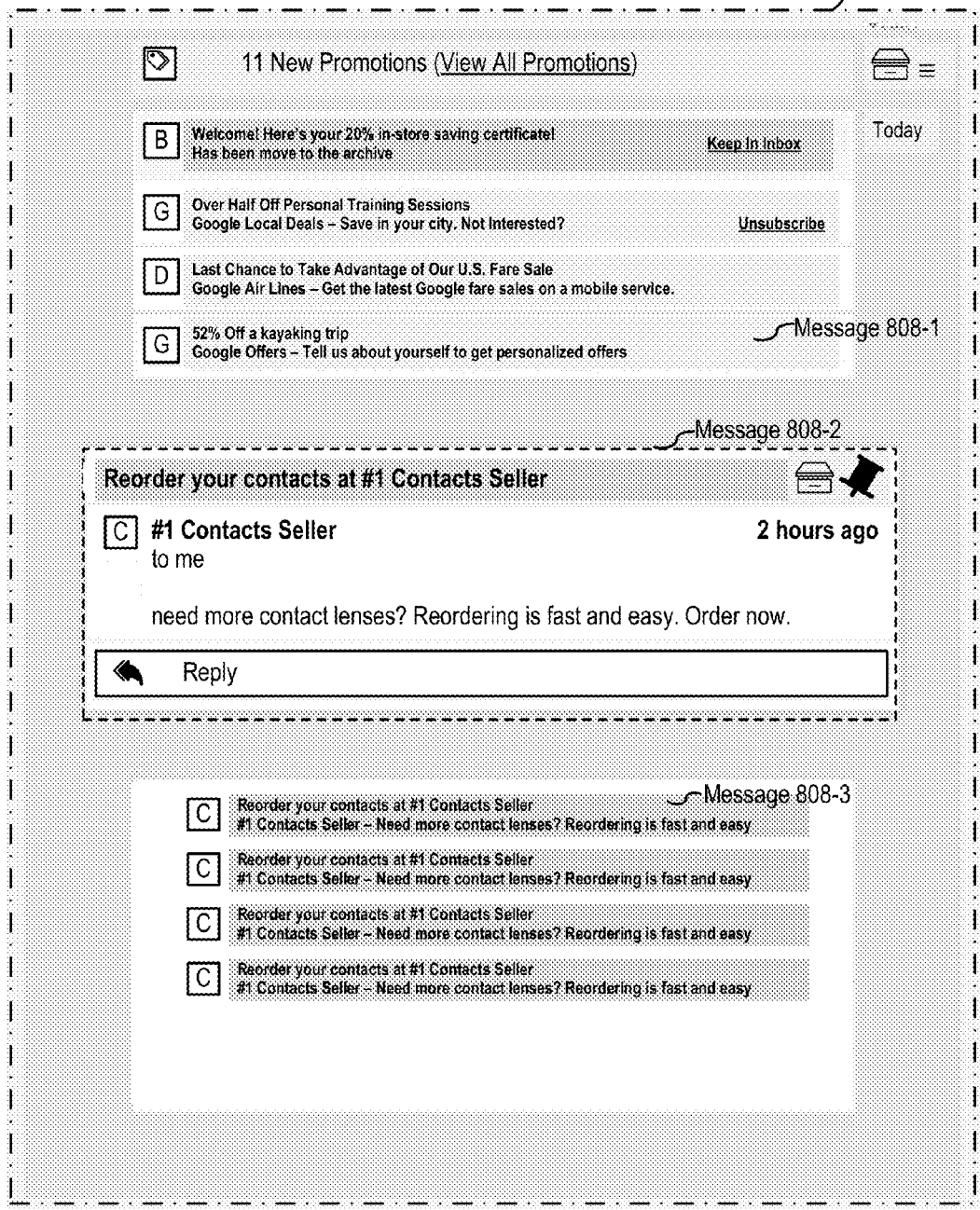

In some implementations, an in-line expansion (e.g., an in-line expanded view) of an electronic message (or a portion thereof) within a message cluster is provided. In some implementations (518), the first message cluster comprises a first plurality of electronic messages, the first plurality of electronic messages includes the first incoming electronic message, and the electronic message folder further includes a second plurality of electronic messages. The method further comprises: responsive to a predefined user action in connection with the first single cluster graphic: expanding display of the first cluster graphic, by: while maintaining display of information representing the second plurality of electronic messages, formatting for display content of an electronic message in the first plurality of electronic messages. For example, as shown in FIG. 8B, within the message cluster 804, message 808-2 is expanded (from a compact view, e.g., a snippet view, as shown in FIG. 8A) and its full content (or a portion thereof, e.g., more content than those included in a message snippet) revealed, in response to a mouse click on the message 808-2.

In some implementations, an in-line expansion (e.g., an in-line expanded view) of a list (e.g., two or more) of electronic messages (or a portion thereof) within a message cluster is provided. In some implementations (520), the first message cluster comprises a first plurality of electronic messages, the first plurality of electronic messages including the first incoming electronic message, and wherein the electronic message folder further includes a second plurality of electronic messages, the method further comprising: responsive to a predefined user action in connection with the first single cluster graphic: expanding display of the first plurality of electronic messages, by: while maintaining display of information representing the second plurality of electronic messages, formatting for display a listing of each message in the first plurality of electronic messages. For example, as shown in FIG. 8A, messages 808-2, 808-3, and 808-4 are part of the message cluster 804; upon a user click on the message 808-2 (but not message 808-1 or message 808-3), messages 808-1, 808-2, and 808-3 are all expanded (e.g., from a snippet view into a full content view).

In some implementations, a "single inclusion" feature is provided. For example, after determining that an electronic message can potentially be clustered into two or more system-provided clusters, the cluster system 106 places the electronic message into one system-provided cluster, but not the other system-provided cluster, e.g., to avoid potential confusion (which might arise if/when a same message is duplicated in several message clusters and thus displayed in several cluster graphics). In some implementations, the first incoming electronic message further satisfies a second set of content-based clustering rules associated with a second message cluster, and the clustering system 106 forgoes (522) association of the first incoming electronic message with the second message cluster. In some implementations, the first and second sets of content-based clustering rules are system-defined clustering rules (524). As another example, after analyzing an email that includes both detail description of recommended travel destinations in Alaska and ongoing promotions on cruise trips to Alaska, the clustering system 106 determines that the email can be potentially classified as both "Travel" and "Promotion." If, however, the email is deemed to include more "Travel" related characteristics than "Promotion" related ones, e.g., the email was sent by a well-known travel organization (e.g., the AAA club) rather than by a establish online merchant (e.g., the GOOGLE OFFERS system), the email is placed in the "Travel" cluster, but not in the "Promotion" cluster.

In some implementations, a "multi-inclusion" feature is enabled. For example, after determining that an electronic message can potentially be clustered into two or more user-provided clusters, the cluster system 106 places the electronic message into both user-provided clusters, which may better fit a user's particular need. In some implementations, the first incoming electronic message further satisfies a second set of content-based clustering rules associated with a second message cluster, and the clustering system 106 assigns (528) the first incoming electronic message to the second message cluster, and formats for display, in the electronic message folder, the electronic messages in the second message cluster as a second single cluster graphic. In some implementations, the first and second sets of content-base clustering rules are system-defined clustering rules (530). In other implementations, the first set of content-based clustering rules are system-defined clustering rules, and the second sets of content-base clustering rules are user-defined clustering rules (532). As another example, after analyzing an email that includes both detail description of travel destinations in Alaska and ongoing promotions on cruise trips to Alaska, the clustering system 106 determines that the email can be classified as both the "Travel" cluster (a system-defined cluster) and the "Promotion." cluster (a system-defined cluster). These approaches are advantageous as they, in some cases, more accurately reflect an email's content and user expectations: in the above example, the email's content relates to both "Travel" and "Promotion"; and as such, a user might expect the email to display in both the "Travel" cluster graphic and the "Promotion" cluster graphic.

In some implementations, a feature sometimes referred to as "an action on one is an action on all" is provided. In some implementations, the first message cluster comprises a first plurality of electronic messages, the first plurality of electronic messages including the first incoming electronic message; the method further comprises: responsive to a predefined user action with respect to the first single cluster graphic; causing the predefined user action to be applied to each electronic message in (or associated with) the first plurality of electronic messages (526). In some implementations, the predefined user actions include one of the following: delete, archive, label, mark as not read, and mark as not seen. For example, in some cases, deleting the "Promotion" cluster 804 (shown in FIG. 8B) causes messages (e.g., emails, chat messages, and tasks, such as messages 808-1, 808-2, and 808-3 shown in FIG. 8B) within the "Promotion" cluster to be deleted.

Figure 8C:
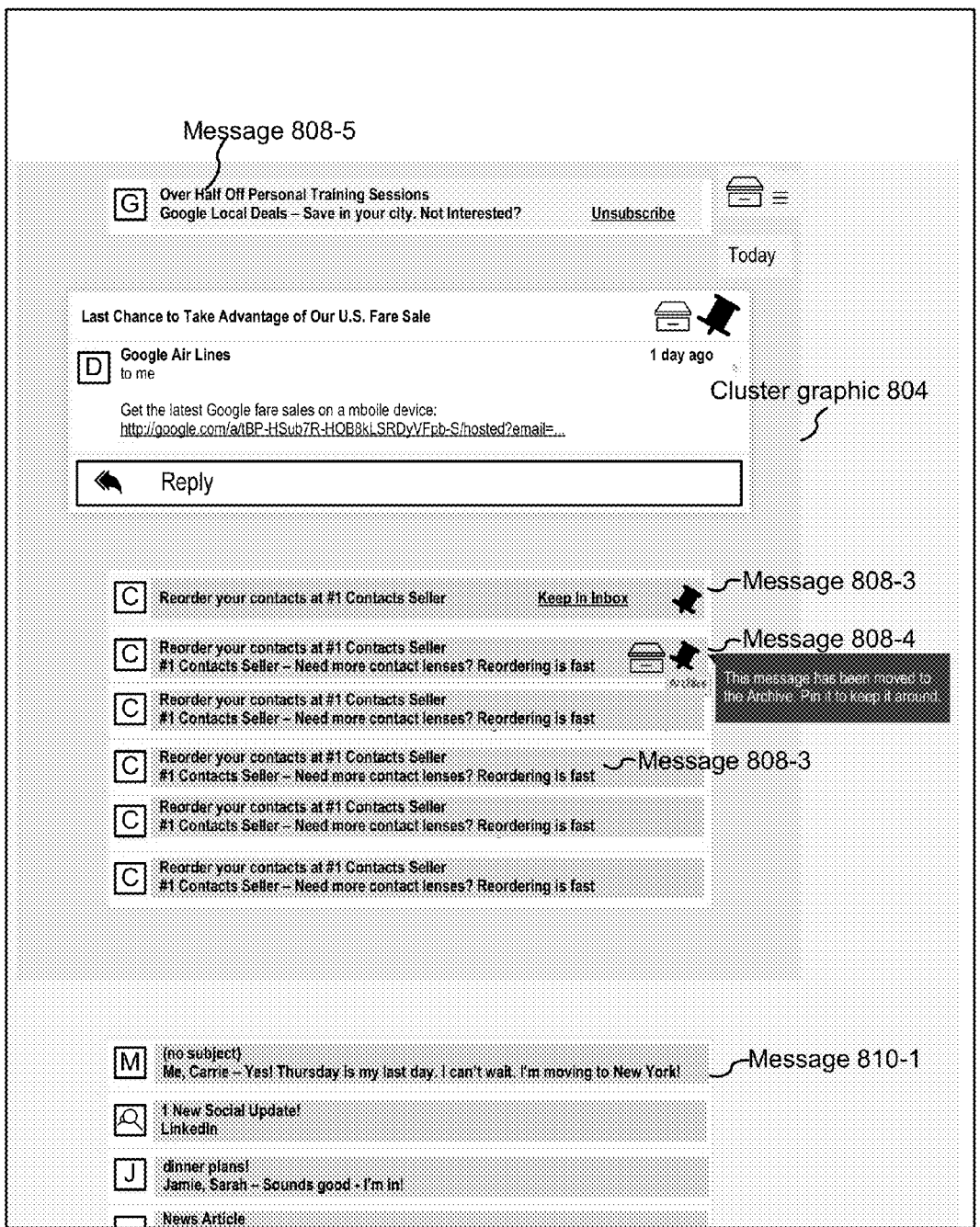

In some implementations, a message folder includes a combination of individual electronic messages, and message clusters (each of which includes two or more individual electronic messages). In some implementations, the electronic message folder further includes one or more individual electronic messages; and responsive to a predefined user action, the clustering system 106 formats (534) for display the electronic message folder to a user, by: concurrently displaying to the user: (i) the first single cluster graphic; and (ii) the one or more individual electronic messages. For example, the message inbox 800, as shown in FIG. 8C, includes both an individual message 810-1 and the message cluster graphic 804.

In some implementations, an electronic message already assigned to a message cluster can be disassociated from the cluster. In some implementations, responsive to a predefined user action in connection with an electronic message included in the first message cluster: the clustering system 106 disassociates (514) the electronic message from the first single cluster graphic. For example, as shown in FIG. 8C, the message 808-1 (previously shown in FIG. 8B) is removed from the cluster 804 and thus no longer displayed in the cluster graphic 804. In these ways, a user may—with or without modifying clustering rules—further customize a message cluster by, e.g., using drag and drop, removing existing messages from a cluster, or adding new messages to the cluster.

In some implementations, a cluster graphic is displayed differently from how it was displayed before, when a new message arrives at (e.g., is included as part of) a cluster represented by the cluster graphic. In some implementations, the method further comprises, responsive to a determination that an electronic message in the first message cluster meets predefined priority criteria: increasing a priority associated with the first message cluster graphic corresponding to the first message cluster by: formatting for display the first single cluster graphic in a visually distinctive manner. For example, after a new "Travel" email has arrived in the "Travel" cluster, the "Travel" cluster graphic is moved to the top of the email inbox, displayed with a different font/color/shape, or bolded/italicized/highlighted, so as to render the "Travel" cluster graphic more visually observable to a user.

Figure 6A:
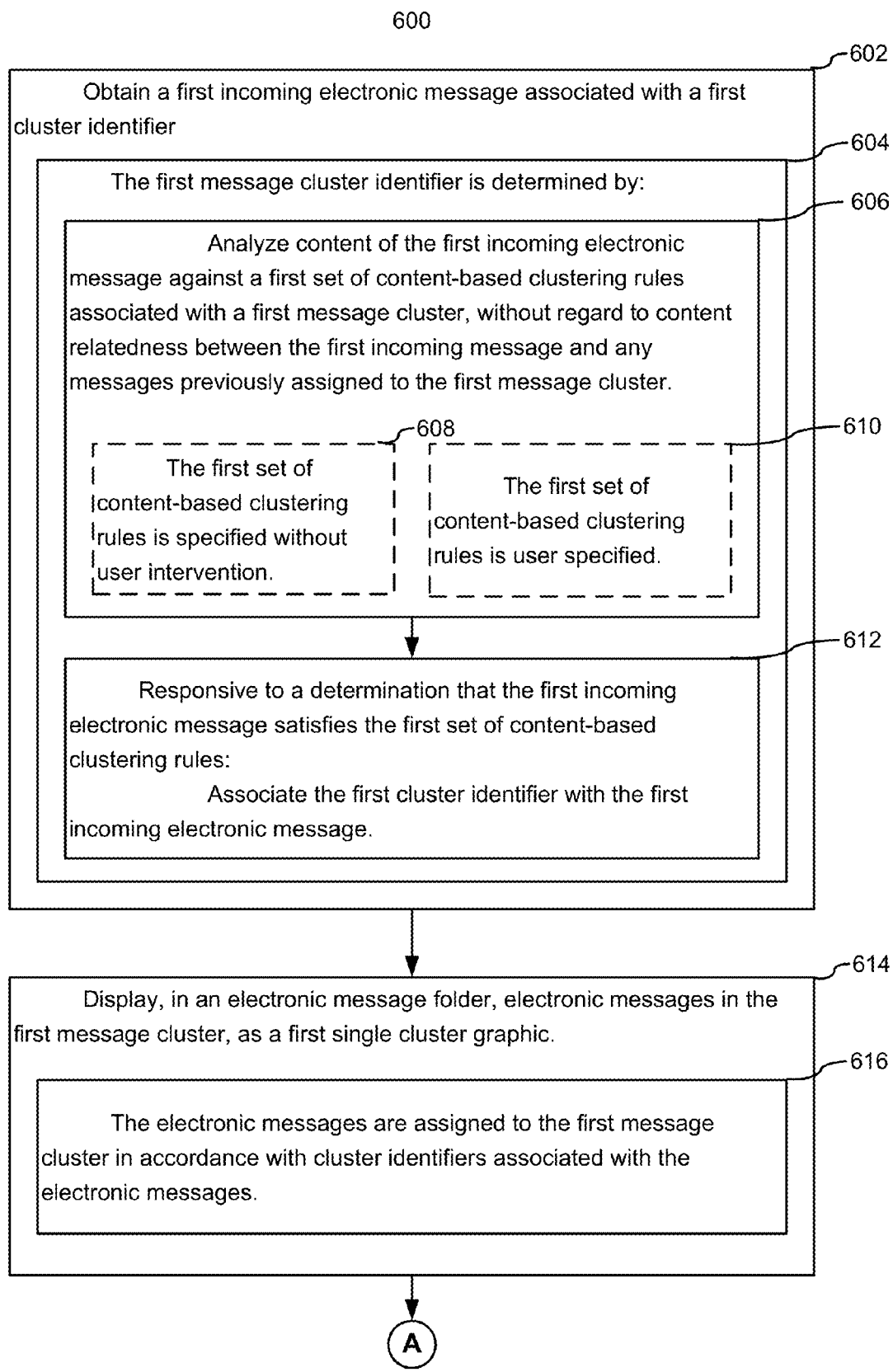
FIGS. 6A-6C are example flow charts illustrating a method 600 for clustering electronic messages, in accordance with some implementations.
Figure 6B:
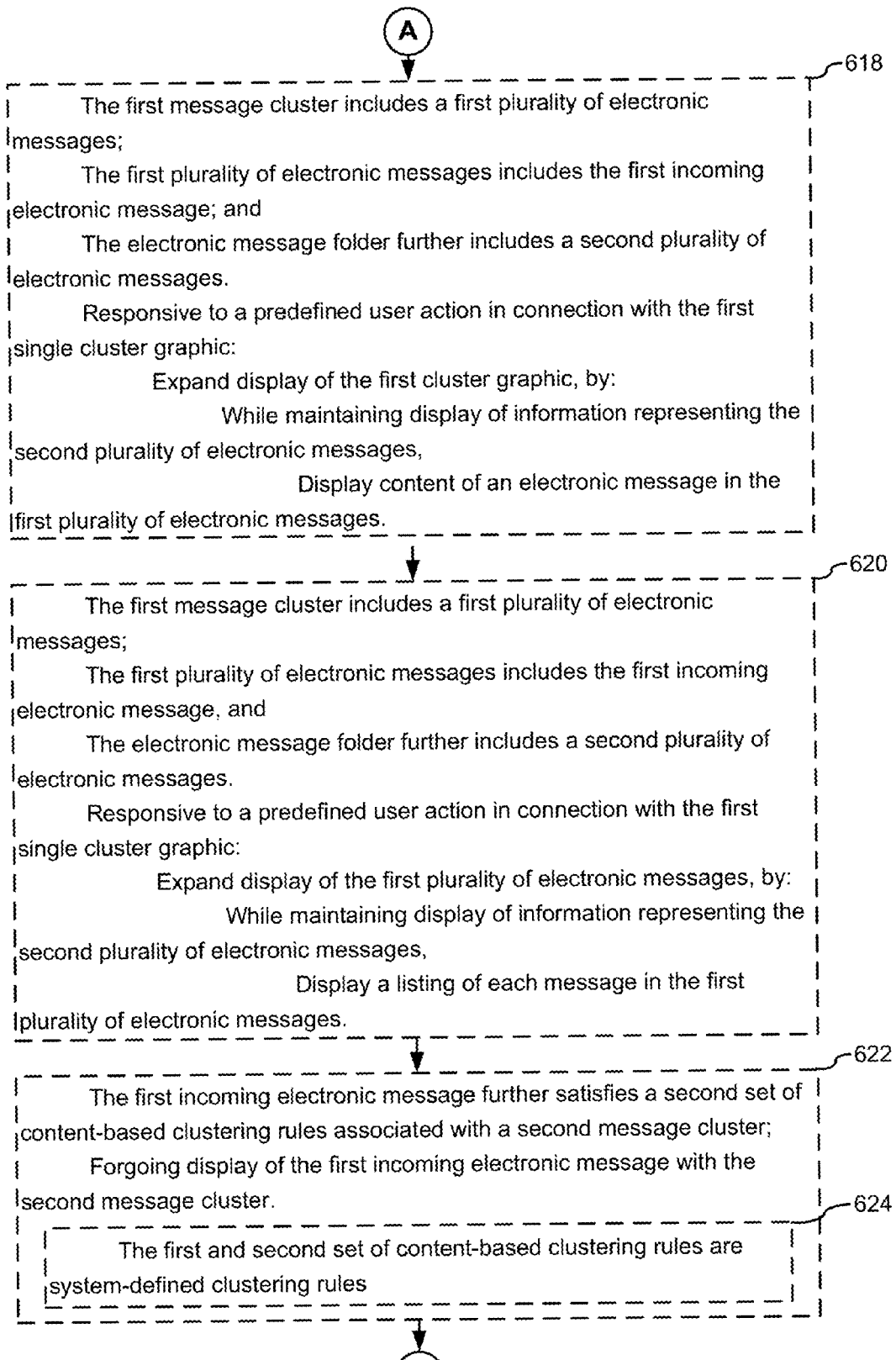
Figure 6C:
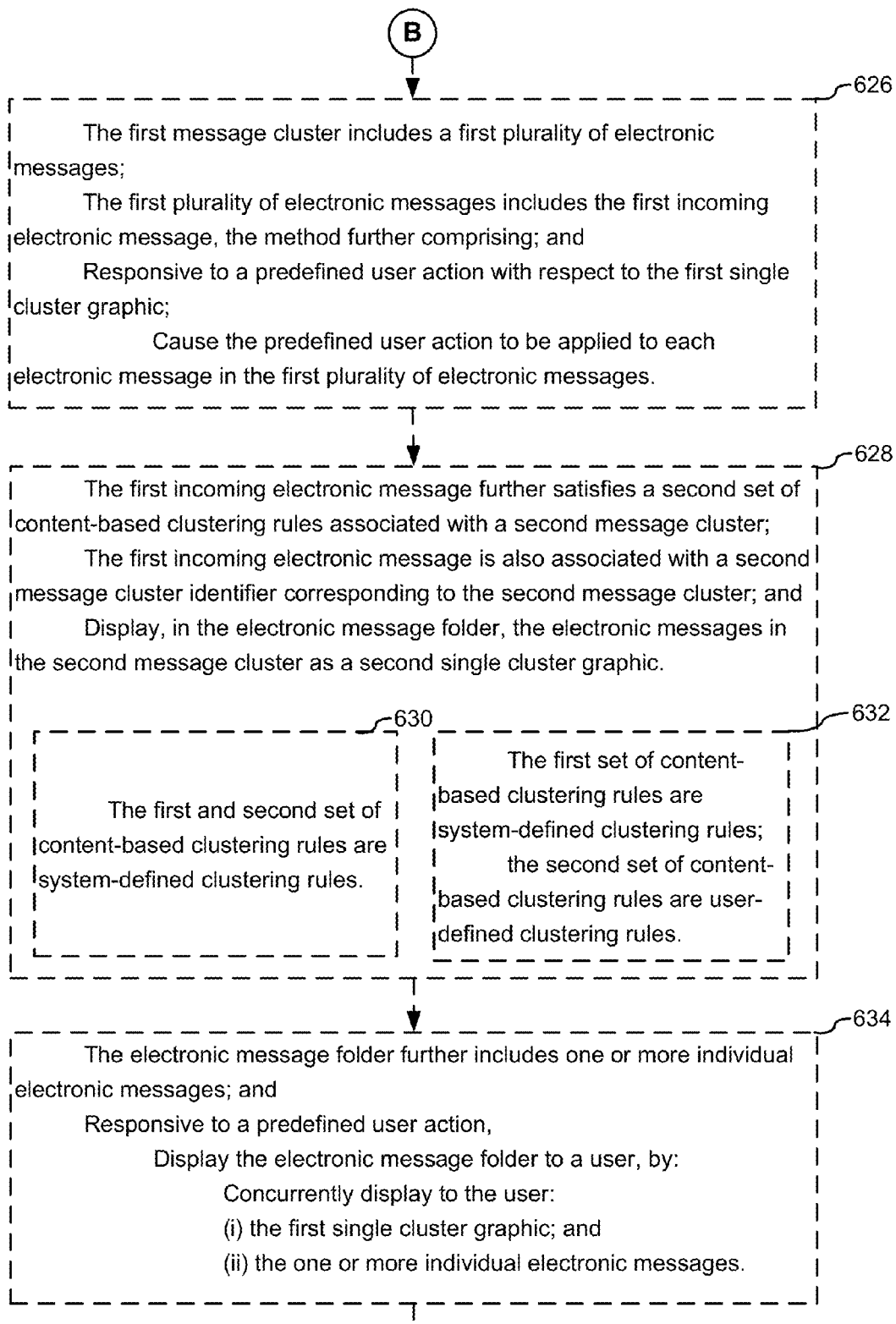

FIGS. 6A-6C are example flow charts illustrating a method 600 for clustering electronic messages, in accordance with some implementations. In some implementations, the method 600 for clustering electronic messages is performed at a computing system, e.g., the device 102. In some implementations, the device 102 includes one or more processors and memory storing one or more programs for execution by the one or more processors. In some implementations, the electronic device includes a sometime called client-side device. In some implementations, the electronic device includes a smartphone (e.g., a GOOGLE ANDROID phone), a mobile computer (e.g., a GOOGLE NEXUS computer, a laptop and a notebook), or a desktop computer.

In some implementations, the device 102 obtains (602) a first incoming electronic message associated with a first cluster identifier. The first message cluster identifier is determined (604) by: (1) analyzing (606) content of the first incoming electronic message against a first set of content-based clustering rules associated with a first message cluster without regard to content relatedness between the first incoming message and any messages previously assigned to the first message cluster; and (2) responsive to a determination that the first incoming electronic message satisfies the first set of content-based clustering rules: associating the first cluster identifier with the first incoming electronic message.

The method further includes displaying, in an electronic message folder, electronic messages in the first message cluster, as a first single cluster graphic. The electronic messages are assigned to the first message cluster in accordance with cluster identifiers associated with the electronic messages.

In some implementations, the first set of content-based clustering rules is specified without user intervention (608). For example, the first set of content-based clustering rules includes rules defined or provided by the computer system and un-modifiable by a user.

In some implementations, the first set of content-based clustering rules is user specified (610). For example, the first set of content-based clustering rules includes rules defined or provided by a user, e.g., user-customized rules.

In some implementations, the method includes an in-line expansion of an electronic message within a cluster. In some implementations, the first message cluster comprises (618) a first plurality of electronic messages, the first plurality of electronic messages includes the first incoming electronic message, the electronic message folder further includes a second plurality of electronic messages, and the method further comprises: responsive to a predefined user action in connection with the first single cluster graphic: expanding display of the first cluster graphic, by: while maintaining display of information representing the second plurality of electronic messages, displaying content of an electronic message in the first plurality of electronic messages.

In some implementations, the method includes an in-line expansion of a list of (e.g., two of more) electronic messages within a cluster. In some implementations, the first message cluster comprises (620) a first plurality of electronic messages, the first plurality of electronic messages including the first incoming electronic message, and the electronic message folder further includes a second plurality of electronic messages, and the method for clustering electronic messages further comprises: responsive to a predefined user action in connection with the first single cluster graphic: expanding display of the first plurality of electronic messages, by: while maintaining display of information representing the second plurality of electronic messages, displaying a listing of each message in the first plurality of electronic messages.

In some implementations, the first incoming electronic message further satisfies (622) a second set of content-based clustering rules associated with a second message cluster, the method further comprises: forgoing display of the first incoming electronic message in the second message cluster. In some implementation, the first and second set of content-based clustering rules are system-defined clustering rules (624).

In some implementations, the first message cluster comprises a first plurality of electronic messages, the first plurality of electronic messages includes the first incoming electronic message, the method further comprises: responsive to a predefined user action with respect to the first single cluster graphic; causing (626) the predefined user action to be applied to each electronic message in (e.g., associated with) the first plurality of electronic messages.

In some implementations, the predefined user action includes one or more of the following user actions: deleting an email, archiving an email, label an email with a label, marking an email as read or not read, and marking an email as seen or not seen.

In some implementation, the first incoming electronic message further satisfies (628) a second set of content-based clustering rules associated with a second message cluster, and the first incoming electronic message is also associated with a second message cluster identifier corresponding to the second message cluster; and the method further comprises: displaying, in the electronic message folder, the electronic messages in the second message cluster as a second single cluster graphic.

In some implementations, the first and second sets of content-base clustering rules are system-defined clustering rules (630). In other implementations, the first set of content-based clustering rules are system-defined clustering rules, and the second sets of content-base clustering rules are user-defined clustering rules (632). As another example, after analyzing an email that includes both detail description of travel destinations in Alaska and ongoing promotions on cruise trips to Alaska, the clustering system 106 determines that the email can be classified as both the "Travel" cluster (a system-defined cluster) and the "Promotion." cluster (a system-defined cluster). These approaches are advantageous as they, in some cases, more accurately reflect an email's content and user expectations: in the above example, the email's content relates to both "Travel" and "Promotion"; and as such, a user might expect the email to display in both the "Travel" cluster graphic and the "Promotion" cluster graphic.

In some implementation, an electronic folder (e.g., an inbox) includes a combination of both individual messages and message clusters. In some implementation, the electronic message folder further includes (634) one or more individual electronic messages; the method further comprises: responsive to a predefined user action, displaying the electronic message folder to a user, by: concurrently displaying to the user: (i) the first single cluster graphic; and (ii) the one or more individual electronic messages.

In some implementations, an electronic message already assigned to a message cluster can be disassociated from the cluster. In some implementations, responsive to a predefined user action in connection with an electronic message included in the first message cluster: the clustering system 106 disassociates (514) the electronic message from the first single cluster graphic. For example, as shown in FIG. 8C, the message 808-1 (previously shown in FIG. 8B) is removed from the cluster 804 and thus no longer displayed in the cluster graphic 804. In these ways, a user may—with or without modifying clustering rules—further customize a message cluster by, e.g., using drag and drop, removing existing messages from a cluster, or adding new messages to the cluster.

In some implementations, a cluster graphic is displayed differently from how it was displayed before, when a new message arrives at (e.g., is included as part of) a cluster represented by the cluster graphic. In some implementations, the method further comprises, responsive to a determination that an electronic message in the first message cluster meets predefined priority criteria: increasing a priority associated with the first message cluster graphic corresponding to the first message cluster by: formatting for display the first single cluster graphic in a visually distinctive manner. For example, after a new "Travel" email has arrived in the "Travel" cluster, the "Travel" cluster graphic is moved to the top of the email inbox, displayed with a different font/color/shape, or bolded/italicized/highlighted, so as to render the "Travel" cluster graphic more visually observable to a user.

Figure 7A:
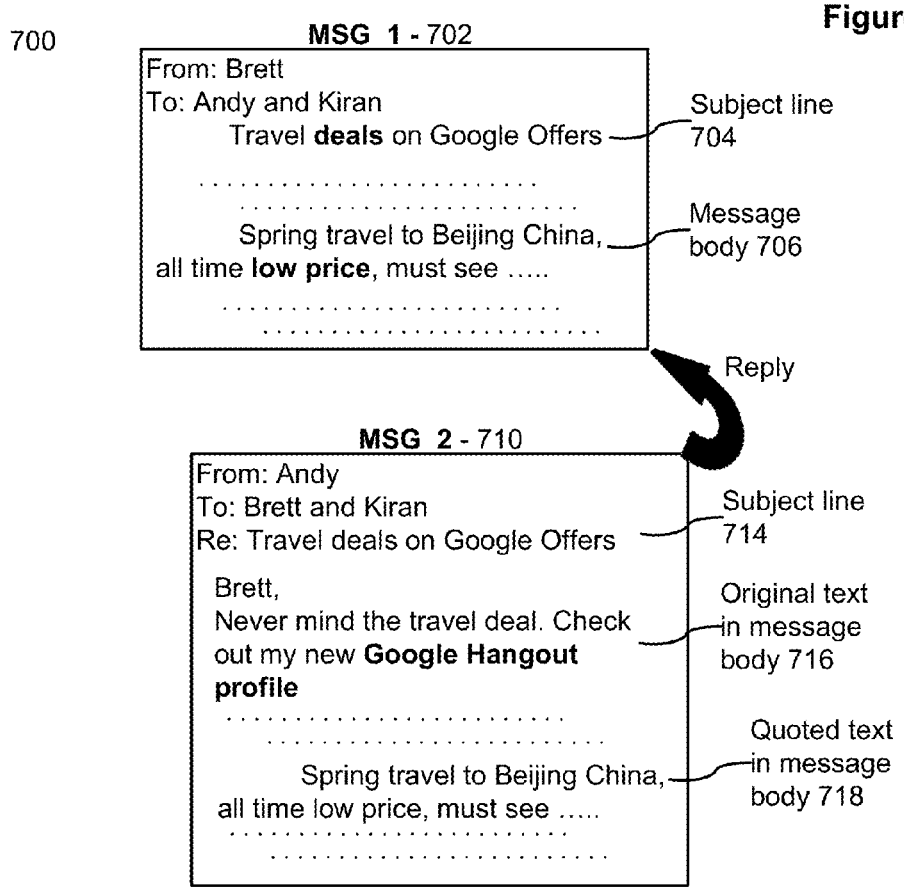
FIG. 7A is an example diagram illustrating a method for clustering electronic message, in accordance with some implementations.
Figure 7A:
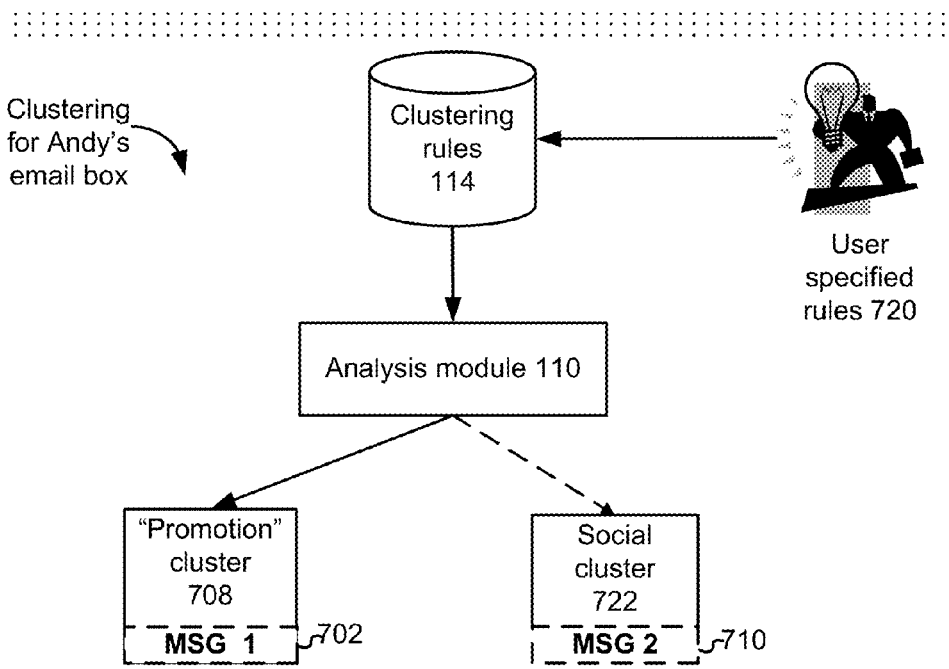

FIG. 7A is an example diagram illustrating a method 700 for clustering electronic message, in accordance with some implementations.

As shown in FIG. 7A, MSG 1 (702), which concerns "Travel deals on Google Offers," is sent from Brett to Andy and Kiran. The subject line 704 includes "Travel deals on Google Offers" the message body 706 includes "Spring travel to Beijing China, all time low price, much see." When analyzing MSG 1, based on clustering rules 114, the analysis module 110 determines that the subject line 704 includes a keyword ("deals") and that the message body includes a key phrase ("low price"), and based on these determinations, concludes that MSG 1 is a "Promotion" message and places MSG 1 in the "Promotion" cluster 708.

As also shown in FIG. 7A, MSG 2 (710), a reply to MSG 1 (702), is sent by Andy to Brett and Kiran. The subject line 714 includes "Re: Travel deals on Google Offers"; the message body includes both original text 716 and quoted text (carried-over text) 718. The original text 716 includes:
"Brett,
Never mind the travel deal. Check out my new Google Hangout profile."
The quoted text 718 includes:
"Spring travel to Beijing China, all time low price, must see."

In this example, the analysis module 110 analyzes content of MSG 2 independently, e.g., without regard to MSG 1, despite the fact that MSG 2 is a reply to MSG 2. For example, based on one of the user specified clustering rules 170, the analysis module 110 determines that quoted text 718 includes the phrase "Google Hangout profile" and that therefore MSG 2 is a "Social" email. Consequently, MSG 2 is placed in the "Social" cluster 710, rather than in the "Promotion" cluster 708. Note that in this example, original text 716 is preferred to the quote text 718 (e.g., accorded more weight), when MSG 2 is analyzed and clustered. In other implementation, original text 716 is less preferred to or treated equally as the quote text 718 (e.g., accorded less or same weight, respectively), because in some cases quoted text reflects more accurately the original/initial intent of email thread/conversation.

Figure 7B:
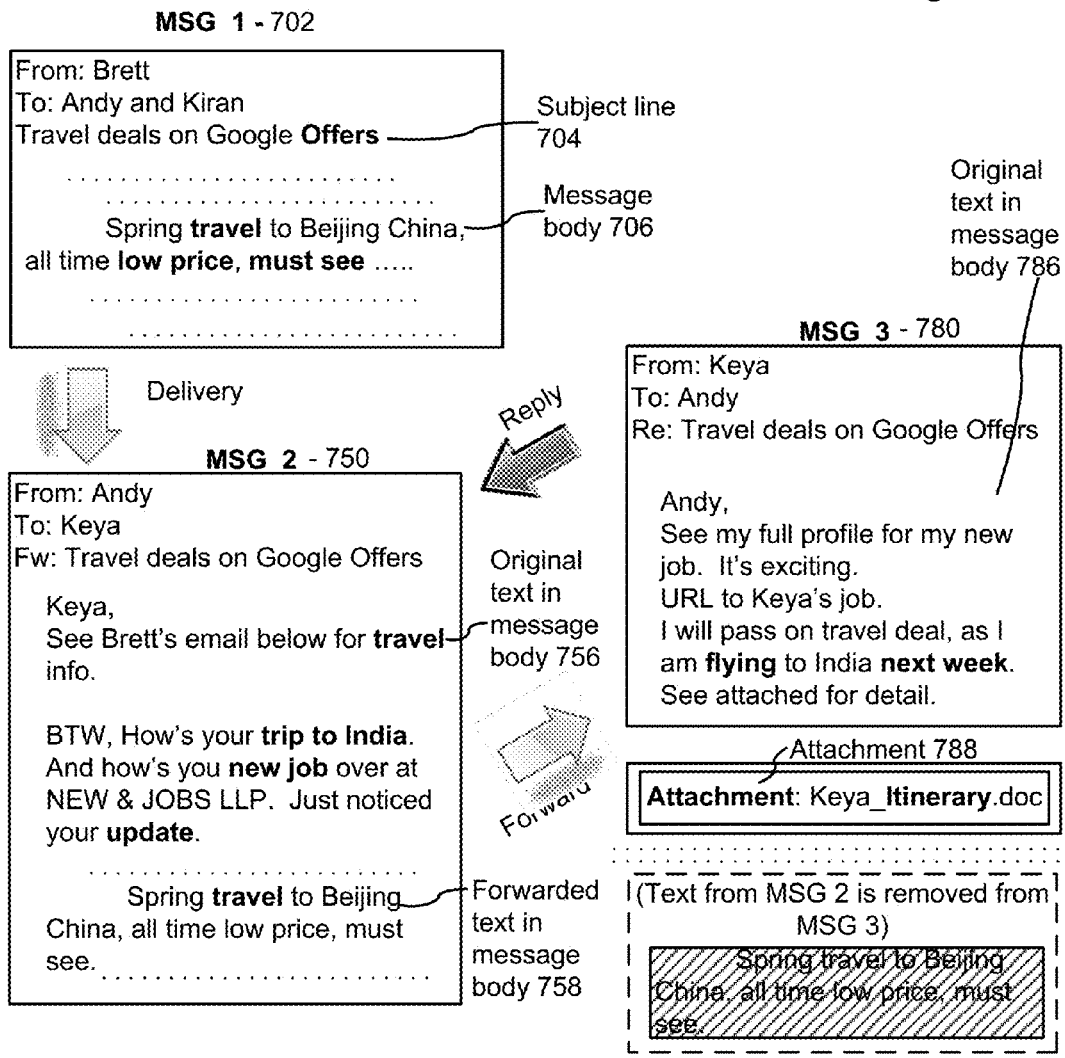
FIG. 7B is an example diagram illustrating a method for clustering electronic message, in accordance with some implementations.
Figure 7B:
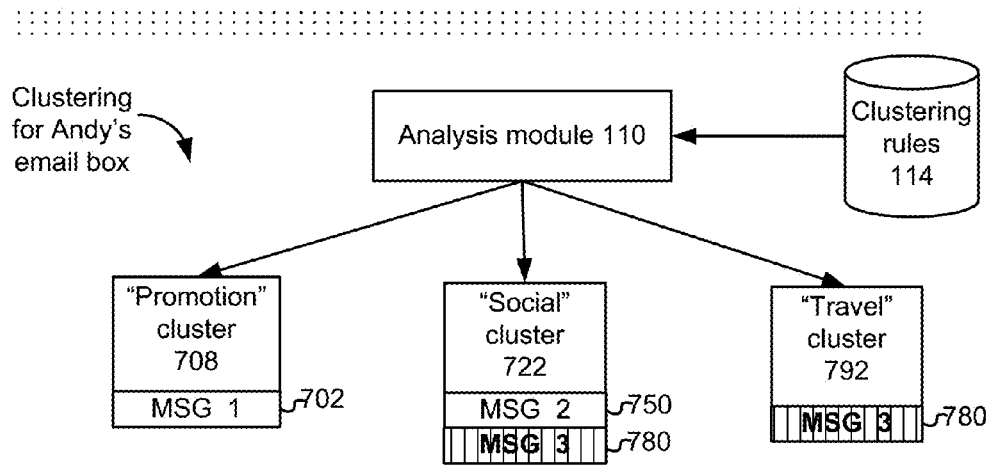

FIG. 7B is an example diagram illustrating a method for clustering electronic message, in accordance with some implementations.

As shown in FIG. 7B, MSG 1 (702), which concerns "Travel deals on Google Offers," is sent from Brett to Andy and Kiran. The subject line 704 includes "Travel deals on Google Offers" the message body 706 includes "Spring travel to Beijing China, all time low price, must see." When analyzing MSG 1, based on clustering rules 114, the analysis module 110 determines that the subject line 704 includes a keyword ("deals") and that the message body includes a key phrase ("low price"), and based on these determinations, concludes that MSG 1 is a "Promotion" message and places MSG 1 in the "Promotion" cluster 708.

As also shown in FIG. 7B, Andy sends MSG 2 (750) (by forwarding MSG 1 with additional content) to Keya; MSG 2 includes original text in message body 756 (e.g., content by Andy to Keya that is not within MSG 1) and forwarded text in message body 758 (e.g., a portion of MSG 1).

Concerning MSG 2, the analysis module 110 determines that the original text in message body 756 includes the phrase "trip to Indian" (indicative of a "Travel" email), and the phrases "new job" and "social media update" (both of which are indicative of a "Social" email). In this example, the analysis module 110 disregards (e.g., without regard to) the fact that MSG 1 relates to MSG 2 (e.g., MSG 2 includes a forward of a portion in MSG 1), but identifies MSG 2 as a "Social" email—based on the fact that the original text in message body 756 includes more social related content ("new job" and "social media update") than travel relate content ("trip to India").

As further shown in FIG. 7B, Keya replies to Andy (by replying MSG 2 with MSG 3); MSG 3 (780) includes original text in message body 786 (e.g., content by Keya to Andy that is not within MSG 1 or MSG 2), but excludes text from MSG 2 (e.g., the original text in message body 756 and the forwarded text in message body 758). In addition, MSG 3 also includes an attachment 788 that is independent of the original text in message body 786.

Concerning MSG 3, the analysis module 110 determines that the original text in message body 786 includes a URL to a particular website known for having social and professional updates, which is highly indicative of a "Social" email.

The analysis module 110 further analyzes the attachment 788 and determines that name of the attachment 788 includes the words "Keya" and "Itinerary" (the combination of which suggests a personal travel itinerary, and thus a "Travel" email).

In this example, the analysis module 110 additionally takes into consideration (e.g., with regard to) the relationships among MSG 1, MSG 2, and MSG 2: (1) MSG 3 is a directly reply to MSG 2 (a "Travel email"), which weighs in favor of classifying MSG 3 as a "Travel" email; (2) MSG 3 indirectly relates to MSG 1 (a "Travel" email), which also weighs in favor of classifying MSG 3 as a "Travel" email; and (3) MSG 3 does not includes text found in both MSG 1 and MSG 2 (e.g., the message body 706 or the forward text in message body 758), which weighs against or in disfavor of classifying MSG 3 as "Travel" email.

Based on these determinations, in this example, the analysis module 110, using content-based clustering rules 114, classifies MSG 3 as both a "Social" email and a "Travel" email, and accordingly places MSG 3 in both the "Social" cluster 722 and the "Travel" cluster 792."

FIGS. 8A-8D are screen images showing an example user interface in which clustered electronic messages are displayed, in accordance with some implementations.

In FIG. 8A, the user interface 800 includes an email inbox 801. The email inbox 801 displays 3 message cluster graphics 802, 804, and 806. The message cluster graphic 804 includes individual messages 808-1, 808-2, and 808-3 e.g., all of which are displayed in a snippet view.

In FIG. 8B, as shown, once a user selects the message 808-2, full content of the message 808-2 is displayed. This is compared to the snippet view show in FIG. 8A.

In FIG. 8C, as shown, individual messages within a message cluster graphic can be manipulated individually. For example, the message 808-3 is kept in inbox, while message 808-4 is to be archived. In additional to email messages, social updates, such as the message 810-1, are also displayed in the email inbox 801.

Figure 8D:
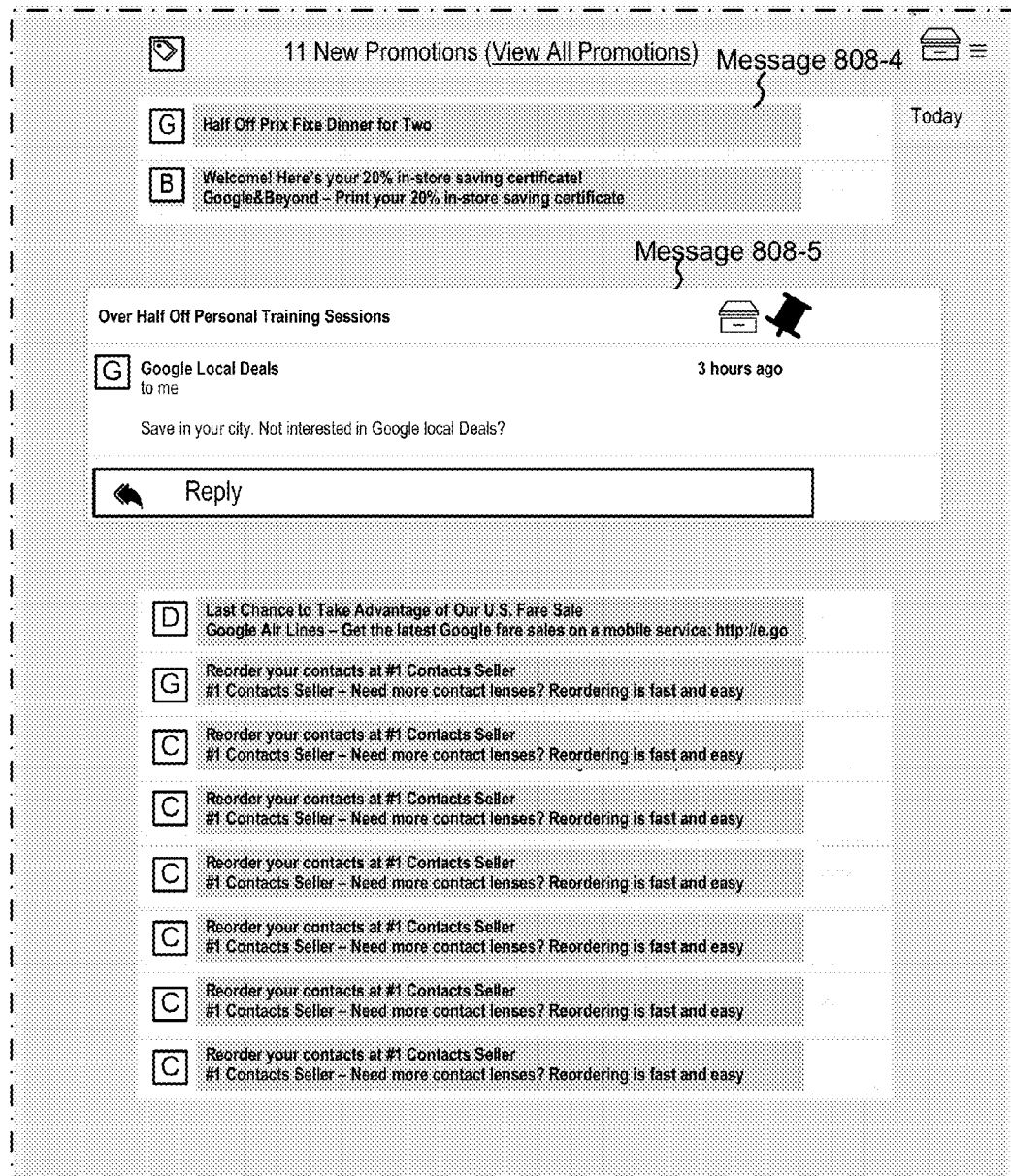

In FIG. 8D, as shown, after a new electronic message 808-4 is clustered into the "Promotion" cluster, the message 808-4 is displayed in a snippet view in the cluster graphic 804. Because the message 808-4 is a new message, it is displayed on top of the cluster graphic 804. Also as shown, when a user hover over a message in a message cluster graphic, the message is displayed in a different view, e.g., a full content view. This is compared with the way message 808-5 is displayed in FIG. 8C, e.g., a snippet view.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first message cluster could be termed a second message cluster, and, similarly, a second message cluster could be termed a first message cluster, without changing the meaning of the description, so long as all occurrences of the "first message cluster" are renamed consistently and all occurrences of the "second message cluster" are renamed consistently. The first message cluster and the second message cluster are both message clusters, but they are not the same message cluster.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail. The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A method comprising:
   at a computing device having one or more processors and memory storing one or more programs for execution by the one or more processors:
   displaying a messaging application for a first user;
   responsive to a determination that a message body of a first electronic message satisfies a first set of content-based clustering rules associated with a first message cluster, assigning the first electronic message to the first message cluster, which has a first plurality of electronic messages, wherein each electronic message in the first message cluster is either addressed to the first user or originates from the first user;
   displaying a first view of a first cluster graphic for the first message cluster, wherein the first view collectively represents the electronic messages in the first message cluster;
   in response to a first predefined user action, displaying a second view of the first cluster graphic, wherein the second view replaces the first view and displays the first plurality of electronic messages individually within the first message cluster; and
   in response to a second predefined user action, expanding one or more electronic messages of the first plurality of electronic messages inline within the first message cluster.

2. The method of claim 1, wherein:
   the first plurality of electronic messages is formatted for display within an electronic message folder of the messaging application;
   the first electronic message is assigned to the first message cluster and is thereby included in the first plurality of electronic messages;
   the electronic message folder further includes a second plurality of electronic messages not associated with the first message cluster; and
   displaying the second view of the first cluster graphic comprises expanding the first cluster graphic to display the first plurality of electronic messages individually while maintaining display of information representing the second plurality of electronic messages.

3. The method of claim 1, wherein the first set of content-based clustering rules is specified without user intervention.

4. The method of claim 1, wherein the first set of content-based clustering rules is user specified.

5. The method of claim 1, wherein the first plurality of electronic messages includes the first electronic message; and
   the method further comprises:
   responsive to a third predefined user action with respect to the first cluster graphic:
   causing the third predefined user action to be applied to each electronic message in the first plurality of electronic messages.

6. The method of claim 1, wherein the first electronic message further satisfies a second set of content-based clustering rules associated with a second message cluster; and
   the method further comprises:
   forgoing association of the first incoming electronic message with the second message cluster.

7. The method of claim 6, wherein the first and second set of content-based clustering rules are system-defined clustering rules.

8. The method of claim 1, wherein the first electronic message further satisfies a second set of content-based clustering rules associated with a second message cluster; and
   the method further comprises:
   assigning the first electronic message to the second message cluster; and
   formatting for display, in an electronic message folder of the messaging application, the electronic messages in the second message cluster as a second cluster graphic.

9. The method of claim 8, wherein the first and second sets of content-based clustering rules are user-defined clustering rules.

10. The method of claim 8, wherein
    (i) the first set of content-based clustering rules comprises system-defined clustering rules; and
    (ii) the second set of content-based clustering rules comprises user-defined clustering rules.

11. The method of claim 1, wherein the first electronic message is formatted for display within an electronic message folder of the messaging application that includes one or more individual electronic messages that are not associated with the first message cluster; and
    the method further comprises:
    responsive to a third predefined user action:
    formatting for display the electronic message folder for the user, by:
    concurrently displaying to the user:
    (i) the first cluster graphic; and
    (ii) the one or more individual electronic messages.

12. The method of claim 1, further comprising:
    responsive to a third predefined user action in connection with an electronic message included in the first message cluster:
    disassociating the electronic message from the first cluster graphic.

13. A computing system, comprising:
one or more processors;
memory; and
one or more programs, wherein the one or more programs are stored in the memory and are configured to be executed by the one or more processors, the one or more programs including instructions for:
displaying a messaging application for a first user;
responsive to a determination that a message body of a first electronic message satisfies a first set of content-based clustering rules associated with a first message cluster, assigning the first electronic message to the first message cluster, which has a first plurality of electronic messages, wherein each electronic message in the first message cluster is either addressed to the first user or originates from the first user;
displaying a first view of a first cluster graphic for the first message cluster, wherein the first view collectively represents the electronic messages in the first message cluster;
in response to a first predefined user action, displaying a second view of the first cluster graphic, wherein the second view replaces the first view and displays the first plurality of electronic messages individually within the first message cluster; and
in response to a second predefined user action, expanding one or more electronic messages of the first plurality of electronic messages inline within the first message cluster.

14. The computing system of claim 13, wherein the first plurality of electronic messages includes the first electronic message; and
the one or more programs further include instructions for:
responsive to a third predefined user action with respect to the first cluster graphic:
causing the third predefined user action to be applied to each electronic message in the first plurality of electronic messages.

15. The computing system of claim 13, wherein the first electronic message further satisfies a second set of content-based clustering rules associated with a second message cluster; and
the one or more programs further include instructions for:
forgoing association of the first incoming electronic message with the second message cluster.

16. The computing system of claim 15, wherein the first and second set of content-based clustering rules are system-defined clustering rules.

17. The computing system of claim 13, wherein the first electronic message further satisfies a second set of content-based clustering rules associated with a second message cluster; and
the one or more programs further include instructions for:
assigning the first electronic message to the second message cluster; and
formatting for display, in an electronic message folder of the messaging application, the electronic messages in the second message cluster as a second cluster graphic.

18. The computing system of claim 17, wherein the first and second sets of content-based clustering rules are user-defined clustering rules.

* * * * *